United States Patent [19]
Colwell et al.

[11] Patent Number: 6,101,597
[45] Date of Patent: Aug. 8, 2000

[54] METHOD AND APPARATUS FOR MAXIMUM THROUGHPUT SCHEDULING OF DEPENDENT OPERATIONS IN A PIPELINED PROCESSOR

[75] Inventors: Robert P. Colwell, Portland; Michael A. Fetterman, Hillsboro; Glenn J. Hinton, Portland; Robert W. Martell, Hillsboro; David B. Papworth, Beaverton, all of Oreg.

[73] Assignee: Intel Corporation, Santa Clara, Calif.

[21] Appl. No.: 08/176,370

[22] Filed: Dec. 30, 1993

[51] Int. Cl.⁷ .......................................................... G06F 9/30
[52] U.S. Cl. ................................................................ 712/218
[58] Field of Search ...................... 395/800, 375; 712/218

[56] References Cited

U.S. PATENT DOCUMENTS

| | | | |
|---|---|---|---|
| 4,736,288 | 4/1988 | Shintani et al. | 395/375 |
| 4,752,873 | 6/1988 | Shonai et al. | 395/800 |
| 5,136,697 | 8/1992 | Johnson | 395/375 |
| 5,142,633 | 8/1992 | Murray et al. | 395/375 |
| 5,222,244 | 6/1993 | Carbine et al. | 395/800 |
| 5,313,644 | 5/1994 | Matsuo et al. | 395/800 |
| 5,333,296 | 7/1994 | Bouchard et al. | 395/425 |
| 5,345,569 | 9/1994 | Tran | 395/375 |
| 5,355,457 | 10/1994 | Shebanow et al. | 395/375 |

FOREIGN PATENT DOCUMENTS

WO93/01546  1/1993  WIPO .............................. G06F 9/38

OTHER PUBLICATIONS

Mike Johnson, *Superscalar Microprocessor Design*, 1991, pp 1–289.

V. Popescu, et al., "The Metaflow Architecture," IEEE Micro, pp. 10–13 and 63–73, Jun. 1991.

*Primary Examiner*—John Follansbee
*Attorney, Agent, or Firm*—Blakely, Sokoloff, Taylor & Zafman LLP

[57] ABSTRACT

Maximum throughput or "back-to-back" scheduling of dependent instructions in a pipelined processor is achieved by maximizing the efficiency in which the processor determines the availability of the source operands of a dependent instruction and provides those operands to an execution unit executing the dependent instruction. These two operations are implemented through number of mechanisms. One mechanism for determining the availability of source operands, and hence the readiness of a dependent instruction for dispatch to an available execution unit, relies on the prospective determination of the availability of a source operand before the operand itself is actually computed as a result of the execution of another instruction. Storage addresses of the source operands of an instruction are stored in a content addressable memory (CAM). Before an instruction is executed and its result data written back, the storage location address of the result is provided to the CAM and associatively compared with the source operand addresses stored therein. A CAM match and its accompanying match bit indicate that the result of the instruction to be executed will provide a source operand to the dependent instruction waiting in the reservation station. Using a bypass mechanism, if the operand is computed after dispatch of the dependent instruction, then the source operand is provided directly from the execution unit computing the source operand to a source operand input of the execution unit executing the dependent instruction.

42 Claims, 9 Drawing Sheets

| RESULT DATA | LDST |
|---|---|
|  |  |
|  |  |
| ≈ | ≈ |
|  |  |
|  |  |
| ROB₅ DATA | EAX |
| ROB₆ DATA | EBX |
| ROB₇ DATA | EAX |
| ROB₈ DATA | ECX |
| ROB₉ DATA | ECX |
| ROB₁₀ DATA | EDX |
| ROB₁₁ DATA | EDX |
| ROB₁₂ DATA | † |
| ROB₁₃ DATA | † |

*FIG. 3*

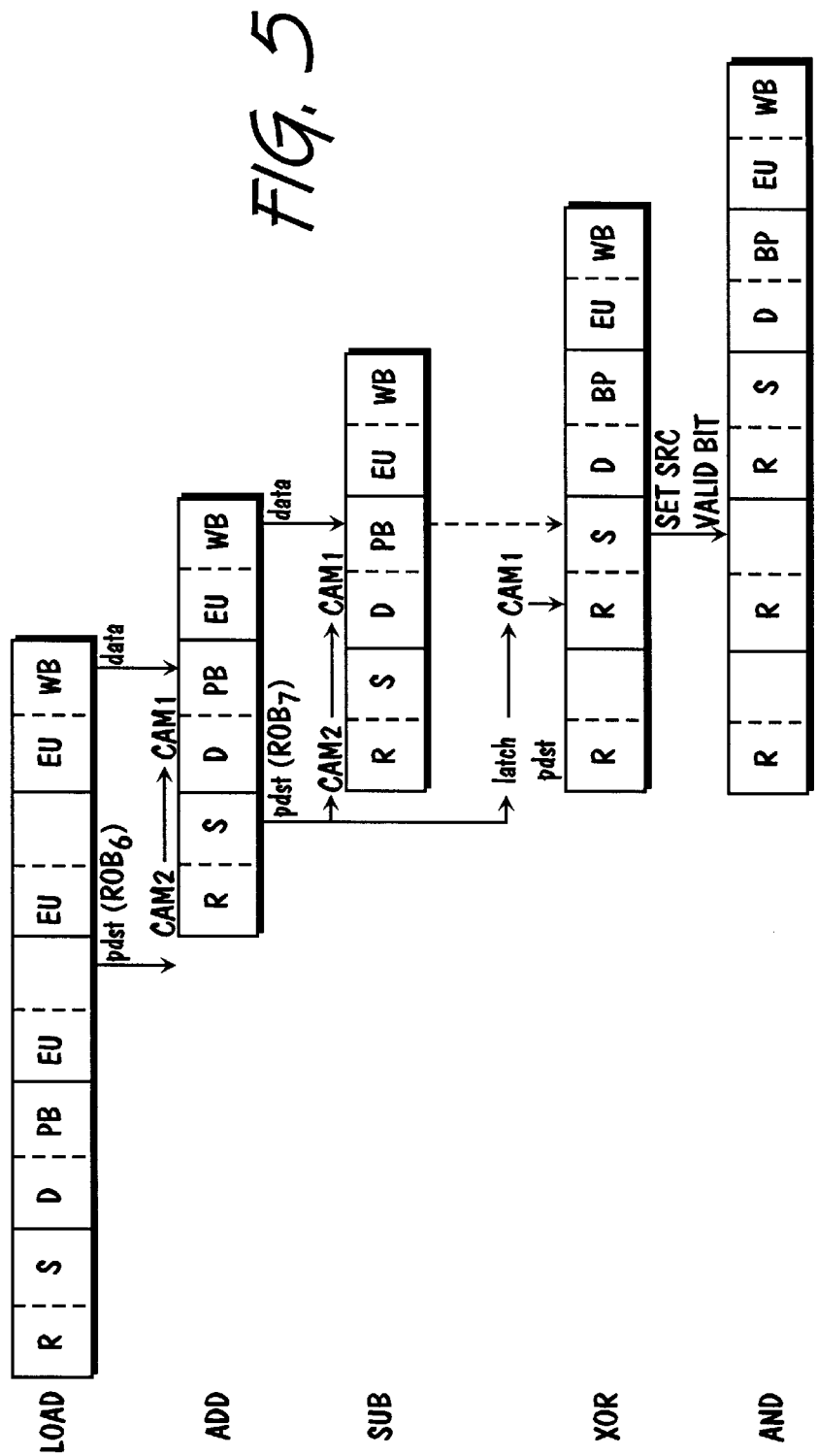

METHOD AND APPARATUS FOR MAXIMUM THROUGHPUT SCHEDULING OF DEPENDENT OPERATIONS IN A PIPELINED PROCESSOR

BACKGROUND OF THE INVENTION

1. Field of the Invention

The present invention relates to pipelined microprocessors, and more particularly to achieving maximum throughput of dependent operations in a pipelined processor.

2. Art Background

Simple microprocessors generally process instructions one at a time. Each instruction is processed using four sequential stages: instruction fetch, instruction decode, execute, and result write back to the register file or memory. Within such microprocessors, different dedicated logic blocks perform each processing stage. Each logic block waits until all the previous logic blocks complete operations before beginning its operation.

To improve microprocessor efficiency, microprocessor designers overlapped the operations of the fetch, decode, execute, and write back stages such that the microprocessor operates on several instructions simultaneously. In operation, the fetch, decode, execute, and write back stages concurrently process different instructions. At each clock cycle the results of each processing stage are passed to the following processing stage. Microprocessors that use the technique of overlapping the fetch, decode, execute, and write back stages are known as "pipelined" microprocessors.

In order for pipelined microprocessors to operate efficiently, an instruction fetch unit at the head of the pipeline must continually provide the pipeline with a stream of instructions. However, conditional branch instructions within an instruction stream prevent an instruction fetch unit at the head of a pipeline from fetching the correct instructions until the condition is resolved. Since the condition will not be resolved until further down the pipeline, the instruction fetch unit cannot necessarily fetch the proper instructions.

To alleviate this problem, some newer pipelined microprocessors use branch prediction mechanisms that predict the outcome of branches, and then fetch subsequent instructions according to the branch prediction. Branch prediction is achieved using a branch target buffer (BTB) to store the history of a branch instruction based only upon the instruction pointer or address of that instruction. Every time a branch instruction is fetched, the BTB predicts the target address of the branch using the branch history. For a more detailed discussion of branch prediction, please refer to Tse Yu Yeh and Yale N. Patt, *Two-Level Adaptive Branch Prediction*, the 24th ACM/IEEE International Symposium and Workshop on MicroArchitecture, November 1991, and Tse Yu Yeh and Yale N. Patt, *Alternative Implementations of Two-Level Adaptive Branch Prediction*, Proceedings of the Nineteenth International Symposium on Computer Architecture, May 1992.

In combination with speculative execution, out-of-order dispatch of instructions to the execution units results in a substantial increase in instruction throughput. With out-of-order completion, any number of instructions are allowed to be in execution in the execution units, up to the total number of pipeline stages in all the functional units. Instructions may complete out of order because instruction dispatch is not stalled when a functional unit takes more than one cycle to compute a result. Consequently, a functional unit may complete an instruction after subsequent instructions have already completed. For a detailed explanation of speculative out-of-order execution, please refer to M. Johnson, *Superscalar Microprocessor Design,* Prentice Hall, 1991, Chapters 2, 3, 4, and 7.

In a processor using out-of-order completion, instruction dispatch is stalled when there is a conflict for a functional unit or when an issued instruction depends on a result that is not yet computed. In order to prevent or mitigate stalls in decoding, the prior art provides for a buffer (known as a reservation station (RS)) between the decode and execute stages. The processor decodes instructions and places them into the reservation station as long as there is room in the buffer, and at the same time, examines instructions in the reservation station to find those that can be dispatched to the execution units (that is, instructions for which all source operands and the appropriate execution units are available).

Instructions are dispatched from the reservation station with little regard for their original program order. However, the capability to issue instructions out-of-order introduces a constraint on register usage. To understand this problem, consider the following pseudo-microcode sequence:

1. t ← load (memory)
2. eax ← add (eax, t)
3. ebx ← add (ebx, eax)
4. eax ← mov (2)
5. edx ← add (eax, 3)

The micro-instructions and registers shown above are those of the well known Intel microprocessor architecture. For further information, reference may be made to the *i486™ Microprocessor Programmers Reference Manual,* published by Osborne-McGraw-Hill, 1990, which is also available directly from Intel Corporation of Santa Clara, Calif.

In an out-of-order machine executing these instructions, it is likely that the machine would complete execution of the fourth instruction before the second instruction, because the third ADD instruction may require only one clock cycle, while the load instruction and the immediately following ADD instruction may require a total of four clock cycles, for example. However, if the fourth instruction is executed before the second instruction, then the fourth instruction would probably incorrectly overwrite the first operand of the second instruction, leading to an incorrect result. Instead of the second instruction producing a value that the third instruction would use, the third instruction produces a value that would destroy a value that the second one uses.

This type of dependency is called a storage conflict, because the reuse of storage locations (including registers) causes instructions to interfere with one another, even though the conflicting instructions are otherwise independent. Such storage conflicts constrain instruction dispatch and reduce performance.

It is known in the art that storage conflicts can be avoided by providing additional registers that are used to reestablish the correspondence between registers and values. Using register renaming, these additional "physical" registers are associated with the original "logical" registers and values needed by the program. To implement register renaming, the processor typically allocates a new register for every new value produced, i.e., for every instruction that writes a register. An instruction identifying the original logical register for the purpose of reading its value obtains instead the value in the newly allocated register. Thus, the hardware renames the original register identifier in the instruction to identify the new register and the correct value. The same register identifier in several different instructions may access different hardware registers depending on the locations of register references with respect to the register assignments.

With renaming, the example instruction sequence depicted above becomes:

1. $t_a \leftarrow$ load (mem)
2. $eax_b \leftarrow$ add ($eax_a$, $t_a$)
3. $ebx_b \leftarrow$ add ($ebx_a$, $eax_b$)
4. $eax_c \leftarrow$ mov (2)
5. $edx_a \leftarrow$ add ($eax_c$, 3)

In this sequence, each assignment to a register creates a new instance of the register, denoted by an alphabetic subscript. The creation of a renamed register for eax in the fourth instruction avoids the resource dependency on the second and third instructions, and does not interfere with correctly supplying an operand to the fifth instruction. Renaming allows the fourth instruction to be dispatched immediately, whereas, without renaming, the instruction must be delayed until execution of the second and third instructions. When an instruction is decoded, its result value is assigned a location in a functional unit called a reorder buffer (ROB), and its destination register number is associated with this location. This renames the destination register to the reorder buffer location. When a subsequent instruction refers to the renamed destination register, in order to obtain the value considered to be stored in the register the instruction may instead obtain the value stored in the reorder buffer if that value has already been computed.

The use of register renaming in the ROB not only avoids register resource dependencies to permit out-of-order execution, but also plays a key role in speculative execution. If the instruction sequence given above is considered to be part of a predicted branch, then one can see that execution of those instructions using the renamed registers in the ROB has no effect on the actual registers denoted by instruction. Thus, if it is determined that the branch was mispredicted, the results calculated and stored in the ROB may be erased and the pipeline flushed without affecting the actual registers found in the processor's register file (RF). If the predicted branch affected the values in the RF, then it would be difficult to recover from branch misprediction because it would be difficult to determine the values stored in the registers before the predicted branch was taken without the use of redundant registers in the ROB.

When a result is produced, it is written to the ROB. The result may provide an input operand to one or more waiting instructions buffered in the reservation station, indicating that the source operand is ready for dispatch to one or more execution units along with the instructions using the operand. When dependent instructions are pipelined, the process of waiting for the result data to be written back from an execution unit in order to determine the availability of a source operand adds latency to the system, thereby limiting instruction throughput. Thus, it is desired to find a means for increasing the throughput of dependent instructions in a pipelined processor.

SUMMARY OF THE INVENTION

The present invention provides a method and apparatus for maximum throughput scheduling of dependent instructions in a pipelined processor. Each instruction is buffered in a reservation station awaiting dispatch to an execution unit. Dispatch occurs when all of an instruction's source operands are available and the appropriate execution unit is available. Each instruction entry in the reservation station includes at least one source data field for storing a source operand of the instruction and an associated source data valid bit. Maximum throughput or "back-to-back" scheduling is achieved by maximizing the efficiency in which the processor determines the availability of the source operands of a dependent instruction and in which the processor provides those operands to the execution unit executing the dependent instruction. These two operations are implemented through a number of mechanisms.

One mechanism for determining the availability of source operands, and hence the readiness of a dependent instruction for dispatch to an available execution unit, relies on the prospective determination of the availability of a source operand before the operand itself is actually computed as a result of the execution of another instruction. Storage addresses of the source operands of an instruction are stored in a content addressable memory (CAM). Before an instruction is executed and its result data written back, the storage location address of the result is provided to the CAM and associatively compared with the source operand addresses stored therein. A CAM match and its accompanying match bit indicate that the result of the instruction to be executed will provide a source operand to the dependent instruction waiting in the reservation station.

Readiness of a source operand may also be determined according to the state of the source data valid bit. Upon allocation of a dependent instruction containing an immediate operand to the reservation station, the source data valid bit associated with the immediate operand is set. Also, the valid bit may be set and used to determine the availability of an operand if the result has been computed by a previous instruction that has already been executed.

Based upon the match bits and/or the source valid bits, a ready logic circuit determines whether all source operands of a dependent instruction are available and thus whether an instruction is ready for dispatch to an available execution unit.

An execution unit receiving a dispatched instruction obtains the source operands by a number of mechanisms. If the operand is an immediate value, then the execution unit receives that value from the source data field of the reservation station entry storing the dispatched instruction. If the operand was already computed through execution of a previous instruction before allocation of the dispatched dependent instruction to the reservation station, then the operand is written to a register buffer. The register buffer comprises a reorder buffer storing speculative result data and a real register file holding retired result data. Upon allocation of the dependent instruction to the reservation station, the operand is written from the register buffer to the appropriate source data field of the instruction in the reservation station. If the operand is computed after allocation, but before dispatch of the dependent instruction, then the operand is written directly to the appropriate source data field of the reservation station entry storing the instruction. Finally, using a bypass mechanism of the present invention, if the operand is computed after dispatch of the dependent instruction, then the source operand is provided directly from the execution unit computing the source operand to a source operand input of the execution unit executing the dependent instruction.

Through these mechanisms, the combination of efficiently determining the readiness of an instruction for dispatch and efficiently providing source operands to an execution unit result in maximum instruction execution throughput.

BRIEF DESCRIPTION OF THE DRAWINGS

The objects, features and advantages of the present invention will be apparent to one skilled in the art in light of the following detailed description in which:

FIG. 3 illustrates a table in a reorder buffer of the present invention.

FIG. 4 illustrates pipeline stages implemented by the present invention.

FIG. 5 illustrates an example of the back-to-back scheduling achieved by the present invention.

DETAILED DESCRIPTION OF THE INVENTION

The present invention provides a method and apparatus for maximum throughput scheduling of dependent instructions in a pipelined processor. To achieve this result, the present invention prospectively determines the availability of the source operands of a dependent instruction before the operands themselves are computed. For purposes of explanation, specific embodiments are set forth to provide a thorough understanding of the present invention. However, it will be apparent to one skilled in the art that the invention may be practiced without these details. In other instances, well known elements, devices, process steps and the like are not set forth in detail in order to avoid unnecessarily obscuring the present invention.

Figure 1:
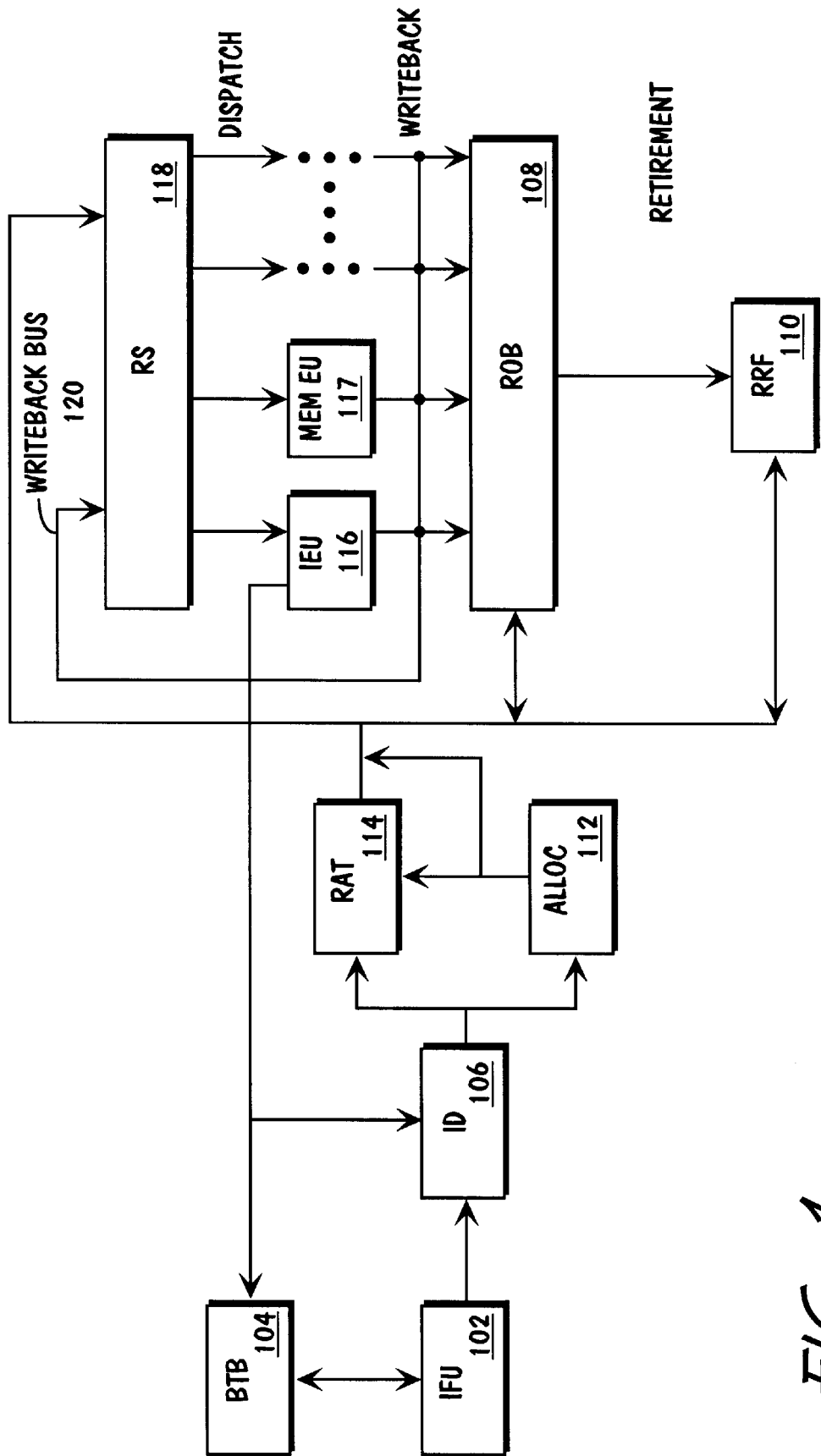
FIG. 1 is a block diagram of a processor of the present invention.

FIG. 1 is a block diagram of an embodiment of a speculative out-of-order processor of the present invention. The processor comprises an instruction fetch unit (IFU) 102 coupled to a branch target buffer (BTB) 104 and an instruction decoder (ID) 106. Base upon the instruction pointer (IP) provided by the BTB 104 to the IFU 102, the IFU 102 fetches the macro instruction found at the address in memory (not shown) that is indicated by the IP. The instruction is decoded into one or more micro-operations (uops) by the instruction decoder 106. Such a decoding mechanism is found in the Intel and similar microprocessor architectures. The instruction decoder 106 transfers the stream of uops to a register alias table (RAT) 114 and an allocator (ALLOC) 112. In one embodiment, the instruction decoder 106 issues up to three in-order uops during each cycle of the processor.

The allocator 112 assigns each incoming uop to a location in the reorder buffer (ROB) 108, thereby mapping the logical destination address (LDST) of the uop to a corresponding physical destination address (PDST) in the ROB. A register alias table (RAT) 114 maintains this mapping.

The contents of a ROB register are retired to a location in a real register file (RRF) 110. The RAT 114 thus also stores a real register file valid bit (RRFV) that indicates whether the value indicated by the logical address is to be found at the physical address in the ROB or in the RRF after retirement. Based upon this mapping, the RAT 114 also associates every logical source address to a corresponding location in the ROB or the RRF (the source operand of one instruction generally must have been the destination of a previous instruction).

Figure 2:
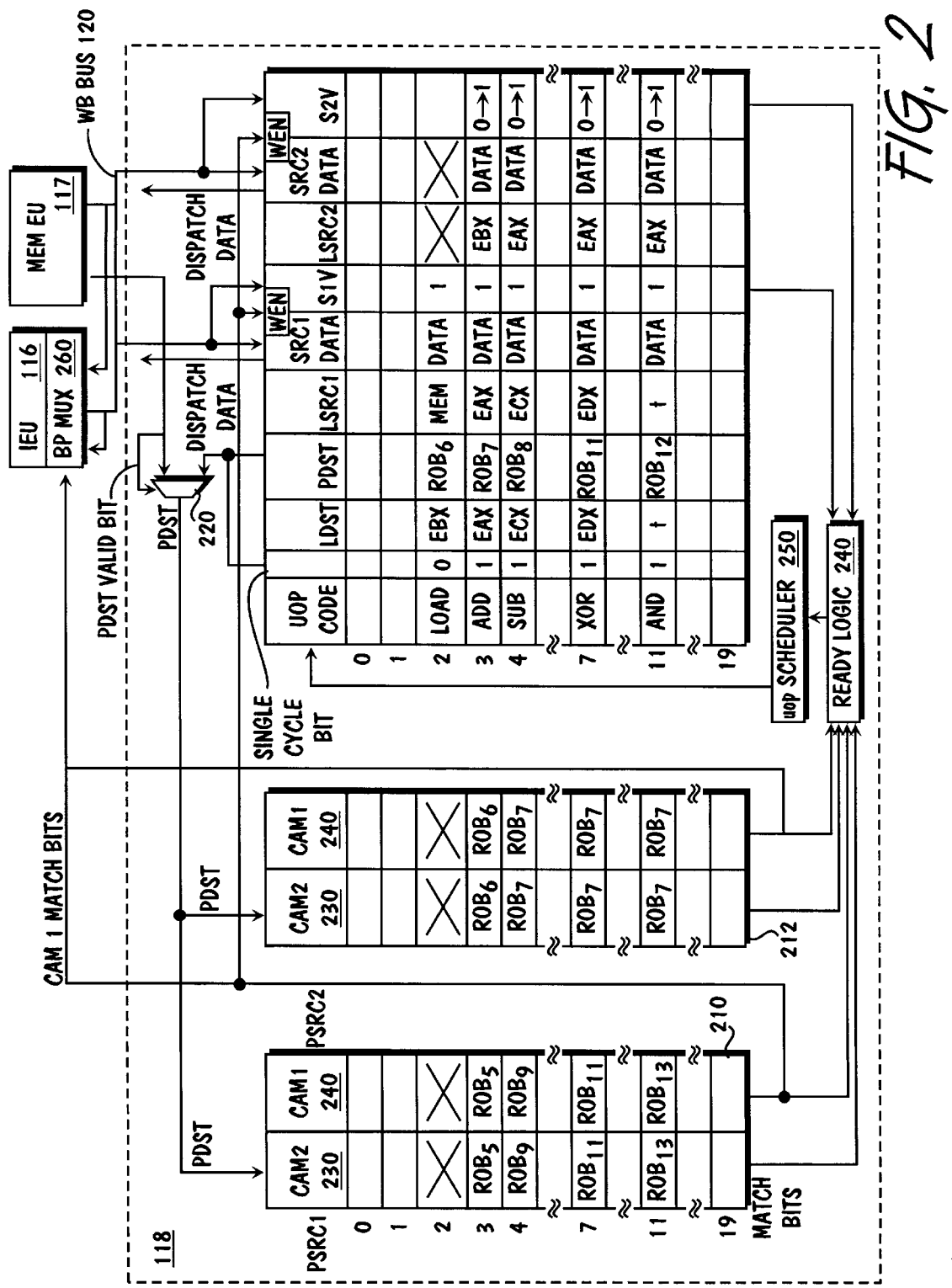
FIG. 2 illustrates a reservation station of the present invention.

Each incoming uop is also assigned and written into an entry in the reservation station 118 by the allocator 112. As shown in FIG. 2, the reservation station (RS) 118 assembles the micro-operations awaiting execution by an appropriate execution unit, such as integer execution unit (IEU) 116 or memory execution unit (MEM EU) 117.

For purposes of illustration, entries 2, 3, 4, 7 and 11 of the RS 118 buffer the micro operations (uops) of the following instruction sequence:

| macro op | uop |
|---|---|
| LOAD (ebx,mem) | ebx←load (mem) |
| ADD (eax,ebx) | eax←add(eax,ebx) |
| SUB (ecx,eax) | ecx←sub(ecx,eax) |
| XOR (edx,eax) | edx←xor(edx,eax) |
| AND (t,eax) | t←and(t,eax) |

In one embodiment this instruction sequence is fetched from an instruction cache (not shown) by the IFU 102 according to predicted instruction pointers from the BTB 104. As an example, the ADD macro instruction is decoded by the instruction decoder 106 into the micro operation eax←add(eax,ebx) in the Intel microprocessor architecture.

FIG. 3 illustrates a table in the ROB 108 showing the mapping of the logical registers specified by the instruction sequence to physical registers in the ROB. In this example, the first logical source eax register (LSRC1 in FIG. 2) of the ADD instruction, which must contain the result of a prior instruction, is mapped by the RAT 114 to the physical destination address (PDST) of that prior instruction at ROB entry PDST=ROB$_5$. Because the logical source register address (LSRC1) of the ADD instruction is the same as the logical destination address (LDST) of the prior instruction, LSRC1 is mapped to a first physical source register address (PSRC1) at the same ROB entry PDST=ROB$_5$. Similarly, the second logical source register ebx (LSRC2), which also must contain the result of a prior instruction, is mapped to a second physical source register (PSRC2) at ROB entry PDST=ROB$_6$. The logical destination register address (LDST) of the ADD instruction, also designated by the logical register address eax, is mapped to a physical destination register address (PDST) at ROB entry PDST=ROB$_7$. Similarly, the other instructions have their logical sources and destinations mapped to physical register identifiers in the ROB 108 by the RAT 114, and their corresponding uops are written into the entries of the reservation station 118. For reasons described below, the physical source register addresses PSRC1 and PSRC2 are stored as tags in content addressable memory (CAM) matching circuitry 210 and 212 for the first and second source operands, respectively. Any number of well known methods and circuits for performing CAM matching of an array of CAM cells against a data input may be used to implement the present invention.

Note that the ADD instruction depends upon the result of the load instruction in that the second source operand of the ADD instruction is stored in the same logical register (ebx) as the result of the load instruction. Similarly, the subtract, exclusive OR (XOR) and AND instructions are dependent upon the ADD instruction in that the ADD instruction writes its results to the eax register, which is the second source operand of those three dependent instructions. For purposes of this example, the ecx, edx and t (temporary) source operand registers are assumed to hold valid data as a result of the execution of previous operations (not shown).

After the logical sources and destinations of a uop have been mapped to physical sources and destinations, and the uop stored at an available entry in the reservation station 118 by the allocator 112, the micro instruction is scheduled for dispatch and executed according to the pipeline stages illustrated in FIG. 4. In one embodiment, the pipestages are divided according to processor clock cycles, with the solid vertical lines representing a rising clock edge and the dashed vertical lines representing a falling clock edge.

In general, during the READY pipestage, the reservation station 118 determines whether the source operands for a micro instruction are available and whether the execution unit for executing that micro instruction is also available. If ready, then the micro instruction enters the SCHEDULE pipestage in which the reservation station determines whether multiple uops need to be dispatched for execution by the same execution unit, and, if so, arbitrates among such uops to determine the order in which they are to be dispatched. During the DISPATCH pipestage, the scheduled uop is read from its entry in the reservation station and delivered to the scheduled execution unit. As will be described in more detail below, after the dispatch of a uop, a POTENTIAL BYPASS pipestage is made available in which result data needed by the uop may be bypassed directly from the execution unit executing a previous instruction to the execution unit executing the current uop. This avoids the necessity of writing the result data to the reservation station 118 or the ROB 108 and then reading the data out as a source operand of the currently executing uop, thus increasing instruction throughput.

During the EXECUTION UNIT and WRITE BACK stages, a uop may then be executed by the scheduled functional unit, and the result data written back from the execution unit into its corresponding ROB entry and into entries of the reservation station 118 that holds uops requiring the result data as a source operand. In addition, as mentioned above, the result data may be bypassed directly to an execution unit requiring the result data. It should be understood that the reservation station pipeline stages that are illustrated in FIG. 4 are but one means of processing an instruction according to the present invention. The present invention is not limited to a processor implementing the pipestages of FIG. 4, but is applicable to any pipelined microprocessor.

As illustrated in FIG. 5, the present invention enables the pipeline stages of micro instructions to be overlapped "back-to-back" in such a way as to achieve maximum execution throughput of the instructions. In processors using the pipestages of FIG. 4, such back-to-back scheduling results in a one cycle throughput. In this example, FIG. 5 illustrates the back-to-back pipelining of the micro instructions of the exemplary micro instruction sequence described above.

In FIG. 5, the load instruction passes through the READY and SCHEDULE stages, and then is dispatched to the memory execution unit 117. In this implementation, the execution of a load instruction takes three clock cycles. After execution, the result data, which is to be stored at the logical source register ebx and the corresponding physical destination register $ROB_6$, is placed on a write back bus 120 so that it may be written into the appropriate PDST entry of the ROB. The result of the load instruction also provides a source operand for the subsequent add micro instruction.

According to one embodiment of the present invention, the memory execution unit 117 provides the PDST of the result two cycles before writing back the result data. This feature is used to allow the dependent ADD instruction to be scheduled for dispatch early enough to allow for the bypassing of the result data. With respect to scheduling, the PDST from the memory execution unit 117 is fed through PDST multiplexer 220 into two-cycle CAM matching circuitry 230 (CAM2), which stores the first and second physical source operand tags PSRC1 and PSRC2. The incoming PDST is associatively matched with these source operand tags in the CAM 2 arrays. In this example, the PDST $ROB_6$ results in a match at entry 3 of the second source operand PSRC2 CAM 2 array, indicating that the second source operand of the ADD instruction will soon become available on the writeback bus 120 from an execution unit. The resulting CAM match bit for entry 3 of the second source operand CAM 2 array is fed into a ready logic circuit 240. As mentioned above, in this example the first source operand (corresponding to eax and located at $ROB_5$) of the ADD instruction is assumed to be available. In this example, we assume that the availability of the first source operand is indicated by setting a source valid bit (S1V) for the first source operand of the ADD instruction in the reservation station 118. This source valid bit is also fed into the ready logic circuit 240. Using this information, the ready logic circuit 240 determines that a source operand is available for dispatch to the appropriate execution unit along with the corresponding instruction when the following logical equation is satisfied:

source ready=[(source valid bit) OR (CAM2 match bit) OR (CAM1 match bit)]

An entire instruction is ready for dispatch when this equation is true for all source operands and an execution unit capable of executing the instruction (as specified by the opcode) is available. (The CAM1 match bit will be described below.) A scheduler circuit 250 maintains information regarding which execution units are available.

In this example, both the first source valid bit and the second source CAM 2 match bit have been set. Consequently, the ready logic circuit 240 determines that the add micro instruction entry will soon have both of its source operands available so that the instruction may be dispatched if the integer execution unit 116 is also available. The ready logic circuit 240 signals the scheduler circuit 250 that entry 3 is ready. In response to this signal, the scheduler circuit 250 will schedule the ADD instruction for dispatch to the integer execution unit 116.

During the writing of the PDST by the memory execution unit 117, the PDST is latched in the CAM circuitry (latch not shown) and used by 1-cycle CAM matching circuitry (CAM1) 240 during the POTENTIAL BYPASS stage. The latched PDST is associatively matched with the first and second source operand tags (PSRC1 and PSRC2) that are stored in the CAM1 240 arrays. The CAM1 match again results in a match for the second source operand (PSRC2) of entry 3. Note that the POTENTIAL BYPASS (BP) stage of the add micro instruction is timed to coincide with the writing back of data from the load micro instruction. The match bit resulting from the second source CAM1 match is used to control an EU bypass multiplexer 260 in the integer execution unit 116. In response to the CAM1 240 match bit, the EU bypass multiplexer 260 routes the result data directly from the memory execution unit 117 to a source operand input of the integer execution unit 116. Thus, upon receiving the dispatched add micro instruction, the integer execution unit 116 has all its source operands immediately available. As shown in FIG. 2, the CAM1 240 match bits are also fed into write enable inputs of the RS 118 to enable the write back of result data to the appropriate source data fields in the reservation station entries for which the PDST of the write back data resulted in a match. The match bit also write enables the source data valid bit entries (S1V or S2V) to receive a writeback valid bit. For a number of operations, an execution unit writes the writeback data valid bit at the same time that it writes result data into the corresponding source data field. For example, an execution unit performing a load operation would write back a data valid bit with the data, and not at the earlier time of the CAM match, in order to ensure that data is not prematurely deemed valid before any potential cache misses are resolved. On the other hand, when the result of an instruction, such as an ADD, is inherently certain to be valid, then the valid bit may be preset to valid. Therefore, the valid bit would be set as soon as the corresponding entry is write enabled by the CAM1 240 match bit.

The foregoing discussion illustrates how the ADD micro instruction is made ready for dispatch and thereafter dispatched with all its source operands valid. The determination of the readiness of the operations dependent upon the ADD instruction will now be discussed. As mentioned above, the execution unit executing a dispatched instruction provides the PDST two cycles before writing back the result data. The PDST is then used to determine the readiness of instructions that depend upon the data to be written back. Here, the ADD instruction is a single cycle uop, i.e., the execution/write back stage occurs in a single processor cycle. The ADD is writing back data with a PDST=$ROB_7$, which represents the logical destination register eax. It is desired to achieve back-to-back scheduling of single cycle uops, such as the ADD instruction, and their dependent instructions. This requires that at least one dependent instruction implement its ready pipestage at the same time that the ADD instruction is being dispatched.

However, this mechanism encounters a potential problem when the instruction writing back the data is a single cycle uop. Given our discussion above, the PDST ($ROB_7$) for the ADD instruction is returned two cycles before the write back. But in this case for the ADD instruction (as shown in FIG. 5), two cycles before write back occurs before the ADD instruction is even dispatched. It is impossible for the execution unit 116 to write back the PDST for the ADD instruction before the ADD instruction is even dispatched. This is the case because it is the act of dispatch that informs the execution unit of the PDST ($ROB_7$) in the first place. Therefore, the present invention utilizes an alternate way to provide the PDST to the CAM2 and CAM1 matching logic. This alternate way is to read the PDST for the ADD instruction directly from the RS 118 before the ADD instruction is dispatched. This is called the early read operation of the present invention.

The present invention provides a mechanism for the early reading of the PDST of a dispatching single cycle instruction (the early read operation) so that the PDST may be read upon the assertion of a schedule line associated with the dispatching instruction and supplied before the instruction is actually dispatched. The details of this early read operation will be discussed in detail further below. The PDST is written into the RS 118 during allocation of the uop to the RS 118. Thus, in this example, after the ADD instruction has been determined to be ready, it is already known that the PDST in the ADD reservation station entry represents the PDST of data that will be written back after execution of the ADD instruction. Accordingly, the present invention provides the PDST bypass multiplexer 220 with the PDST from the ADD uop reservation station entry, and from the multiplexer 220 this PDST is supplied directly to the CAM2 230 match circuitry of the first and second source operands, thereby bypassing the round trip of the PDST from the third reservation station entry to the IEU 116 and back again. From the CAM2 230 circuitry, the PDST is latched into the CAM1 circuitry 240. It is important to realize that the PDST for the ADD is supplied (according to the present invention) in advance of the dispatch cycle of the ADD instruction (see further the discussion with respect to FIG. 7).

To reiterate, the multiplexer 220 provides the PDST directly from the RS 118, and not from an execution unit, when a single cycle uop is to be dispatched. The multiplexing function of the multiplexer 220 may be controlled through a number of methods. First, only those execution units that execute multiple cycle uops are configured to transfer a PDST Valid bit (PDSTV) along with the PDST two cycles before write back. As shown in FIG. 2, the PDSTV bit acts as the input selector control of the PDST bypass multiplexer 220. If the PDSTV bit is set (representing a multicycle uop), then the PDST issued by the execution unit is routed to the CAM2 230 circuitry. The PDSTV bit is transferred along with the PDST itself to the CAM2 230 in order to enable and initiate the CAM matching process. If the PDSTV bit is not set (representing a single cycle uop), then the PDST from the add uop instruction entry of the RS 118 is routed by the multiplexer 220 to the CAM2 230 circuitry, thus bypassing the roundtrip of the PDST through an execution unit. The multiplexer 220 also routes a "single cycle bit" from the RS 118. The single cycle bit, like the PDSTV bit, is used to enable and initiate CAM matching. The single cycle bit is provided as part of the uop opcode during the process of decoding a macro instruction into single cycle uops. An alternative method (not shown) of controlling the PDST bypass multiplexer 220 uses the single cycle bit alone as the multiplexer input selector control.

In this example, the bypassed PDST of the ADD instruction is fed into the CAM2 230 circuitry to identify dependent instructions. The CAM2 match of the PDST=$ROB_7$ results in matches for the second source operand of entries 4, 7 and 11. The match bit at those entries for the second source operand, along with the already set source 1 valid (S1V) bits for those entries indicates that the subtract, XOR and AND operations are ready for dispatch as soon as execution units are available to execute those functions.

Ideally, if different execution units were provided for each operation, all three dependent operations could be dispatched simultaneously. However, in an alternative embodiment, the subtract function and the logical XOR and AND functions may only be executed by the same execution unit, i.e., the integer execution unit 116. Thus, all three operations cannot be dispatched to the IEU 116 at the same time, but rather must be scheduled for dispatch one after the other. The scheduler 250 selects the order of dispatch according to a number of algorithms. The three dependent instructions may, for example, be scheduled randomly, sequentially, or in a first-in-first-out (FIFO) order, or some variation thereof. In this example, the scheduler 250 selects the micro operations to be dispatched in first-in-first-out order as shown in FIG. 5. Because the subtract function is followed by the exclusive OR and logical AND functions, respectively, in the in-order program code, those instructions were issued to the reservation station in that order (from oldest to youngest). Thus, based on the FIFO algorithm scheduling, the subtract uop is dispatched first. The scheduler 250 will be described in more detail below.

As before, the PDST has been latched, and is used by the CAM1 circuitry 240 to control the EU bypass multiplexer 260 of the IEU 116 and the write enables of the reservation station source data entries. The match bit from the second source operand CAM1 240 implements an internal bypass of the result data from the execution of the ADD instruction in the IEU 116 back to the same IEU 116 for use as the second source operand for execution of the SUBTRACT instruction in the IEU 116.

In this case, because the PDST of the ADD instruction also resulted in CAM1matches for entries 7 and 11, the result data from the ADD instruction is written into the second source data fields (SRC2 DATA) of the exclusive OR and logical AND operations, the write enables for those fields having been asserted by the match bit from second source operand CAM1 240.

Fortuitously, the CAM 1 match performed during dispatch of the subtract operation can be used to determine again the readiness of instructions for dispatch. This obviates the need to provide storage for the previously determined ready state (which is another embodiment of the invention). The CAM1 match determines that the XOR and AND operations are ready. However, the CAM1 match bit for the SUBTRACT instruction is not used to determine again the readiness of that instruction because that would result in multiple dispatches of the SUBTRACT instruction. Thus, although the subtract operation uses the CAM1 match bit for controlling the EU bypass multiplexer 260 and the write enables of the RS 118 entries, the ready logic for the entry containing the subtract operation is disabled by the scheduler 250 after scheduling that instruction for dispatch. This operation is performed by resetting an entry valid bit (not shown) in the RS 118, which is fed to the ready logic 240 for each entry. In general, the ready logic for any instruction entry is disabled after it has been scheduled to prevent multiple dispatches of the same instruction.

After the XOR and AND operations have been found ready, the scheduler 250 arbitrates between the two instructions and selects the XOR entry for dispatch according to the FIFO algorithm used in this example. The XOR entry is then dispatched. Because the result data WRITE BACK stage of the add uop coincides with the SCHEDULE stage of the XOR uop, the result data is already stored in the XOR SRC2 DATA by the entry at the time the XOR uop is dispatched, thereby providing the source operand data to the IEU 116. Because the previous result data is available from the RS entry, the EU bypass multiplexer 260 is disabled by the reservation station after the result data has been written into the RS in order to prevent bypassing.

Moreover, during the write back of the result data after execution of the ADD micro instruction, along with the result data that is written into entries of the reservation station 118, corresponding source valid bits are set in those entries using the writeback data valid bit described above. During writeback, the data from the IEU 116 is also written into the ROB 108 via the writeback bus 120. All subsequent instructions, e.g., the logical AND micro operation, then use the source valid bits, which are fed into the ready logic 240, to determine whether a source operand is ready for dispatch.

Figure 6:
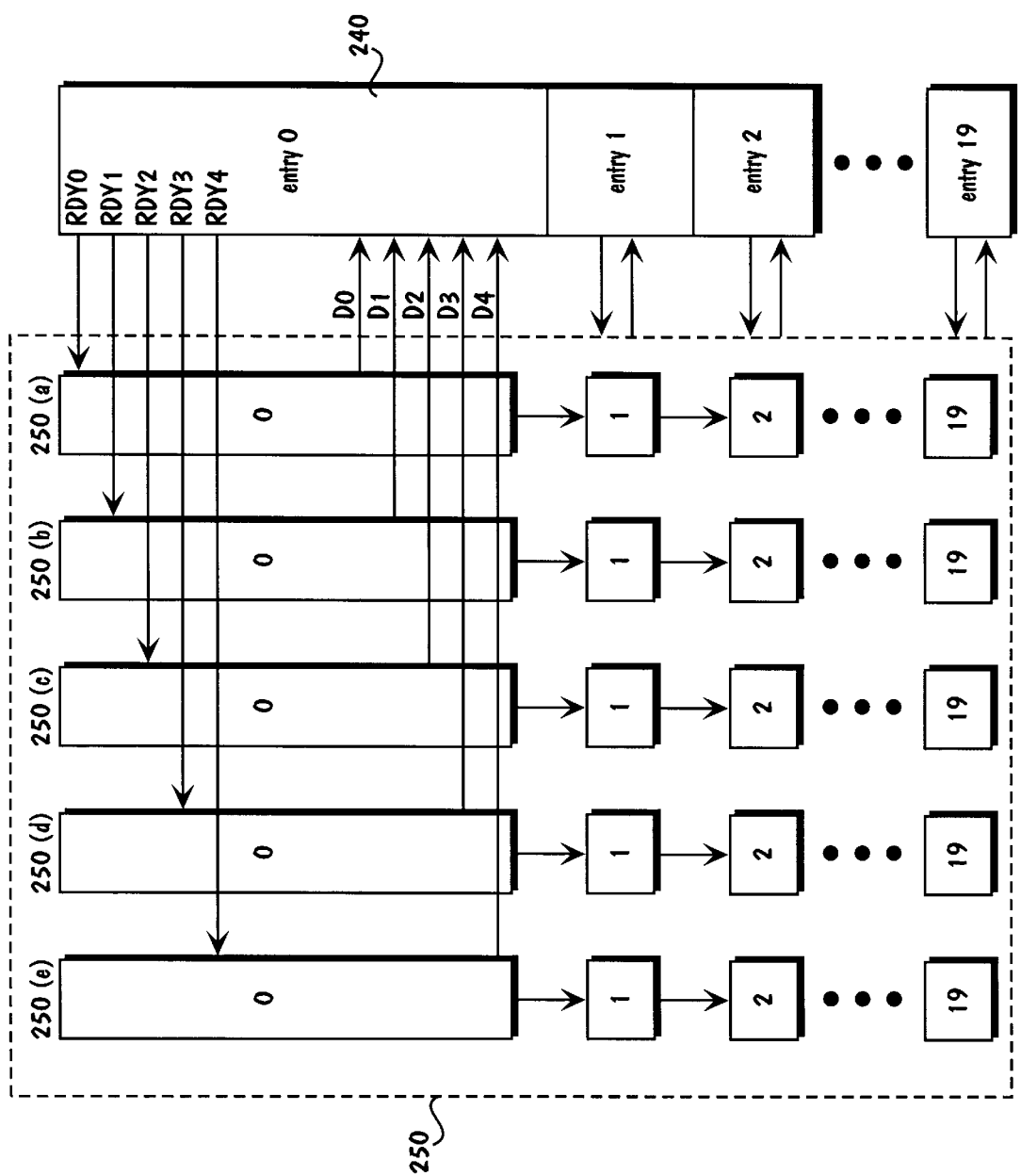
FIG. 6 illustrates the scheduler-to-ready logic interface of the present invention.

Refer to FIG. 6 which illustrates in more detail the scheduler 250 to ready logic 240 interface of the present invention (of FIG. 2). The present invention includes a separate scheduler (250(a)–250(e)) for each execution unit of the present invention. As shown in FIG. 1 there is an integer execution 116 and a memory execution 117 and others within the processor. In one embodiment, the processor contains five execution units in total (some for performing integer, floating point and other computations) and each execution unit has an associated scheduler.

As shown in FIG. 6, a particular entry (e.g., instruction) of the reservation station 118 may become ready to be scheduled on any one of the schedulers because a given instruction may execute on any given and available execution unit. Therefore, each entry of the reservation station transmits a separate ready line to each individual scheduler (250(a)–250(e)). The ready line generation for entry 0 of the reservation station is shown for all five schedule lines (RDY0–RDY4). Although any given instruction may utilize any of the five execution units, specific instructions are limited to certain execution units. Therefore, the purpose of the ready lines, for each entry, is to inform the schedulers to what possible execution units a given instruction can be dispatched. It is appreciated that each of the twenty entries of the reservation station generate five ready signals. It is possible that two or more ready signals, for a given entry, can be asserted assuming that that entry may execute on two or more execution units.

The schedulers decide which of the ready instructions will execute on which execution unit. The schedulers, for each entry of the reservation station 118, send five dispatch signals (D0–D4) back to the ready logic 240 of the reservation station 118. The dispatch lines for entry 0 are illustrated in FIG. 6 and it is appreciated that five equivalent lines are provided for each other entry 1, 2, . . . 19 of the reservation station. Each dispatch signal refers to a separate execution unit that has been selected by the applicable scheduler. The dispatch signals D0–D4 are individually generated by schedulers 250(a)–250(e), respectively. These dispatch signals are asserted during the schedule stage for a given instruction and are often referred to as "schedule signals" for a given entry of the reservation station. For a given entry of the reservation station, only one of the five dispatch signals will be asserted at any given time. For instance, if entry 0 is scheduled to execute over execution unit 0, then the dispatch line (D0) for entry 0 will be asserted and forwarded from the scheduler 250(a) to the reservation station entry zero. In sum, a given entry of the reservation station has five associated dispatch (schedule) lines and only one can be asserted at any given time. These schedule lines (D0–D5) are used during the early reading of PDSTs from the reservation station for scheduling instructions that follow single cycle uops, as will be discussed immediately below.

Refer to FIG. 2. The early read of the RS, as discussed below, supplies a PDST from the RS to one input of the PDST multiplexer 220, while the other input arrives from an execution unit. Except for the PDST column of the reservation station memory array 118, all memory storage elements are based on a static memory storage technique that utilizes a pre-charge line supplied by the system clock. Therefore, data becomes available (e.g., valid data) from these columns at the rising edge of the clock signal. This type of clocked memory is utilized by the present invention reservation station because it is generally less complicated (logically) and consumes less substrate space as compared to memory storage techniques that are not clock based. As referred to herein this memory storage technique is called a dynamic read because it involves the clock edge. It is appreciated that the early read operation of the present invention is utilized for back-to-back scheduling of instructions that are data dependent on single cycle instructions in order to achieve maximum processing throughput.

The PDST column of the reservation station of the early read operation of the present invention is implemented in SRAM and is not a dynamic read circuit and as such is not clock based. Therefore, the PDST storage arrays may supply data within a given clock cycle before the rising edge of the next clock cycle. As referred to herein the memory storage technique for the PDST column is called the static read. The details of both the dynamic read memory cells and the static read memory cells of the present invention will be explained below.

Figure 7:
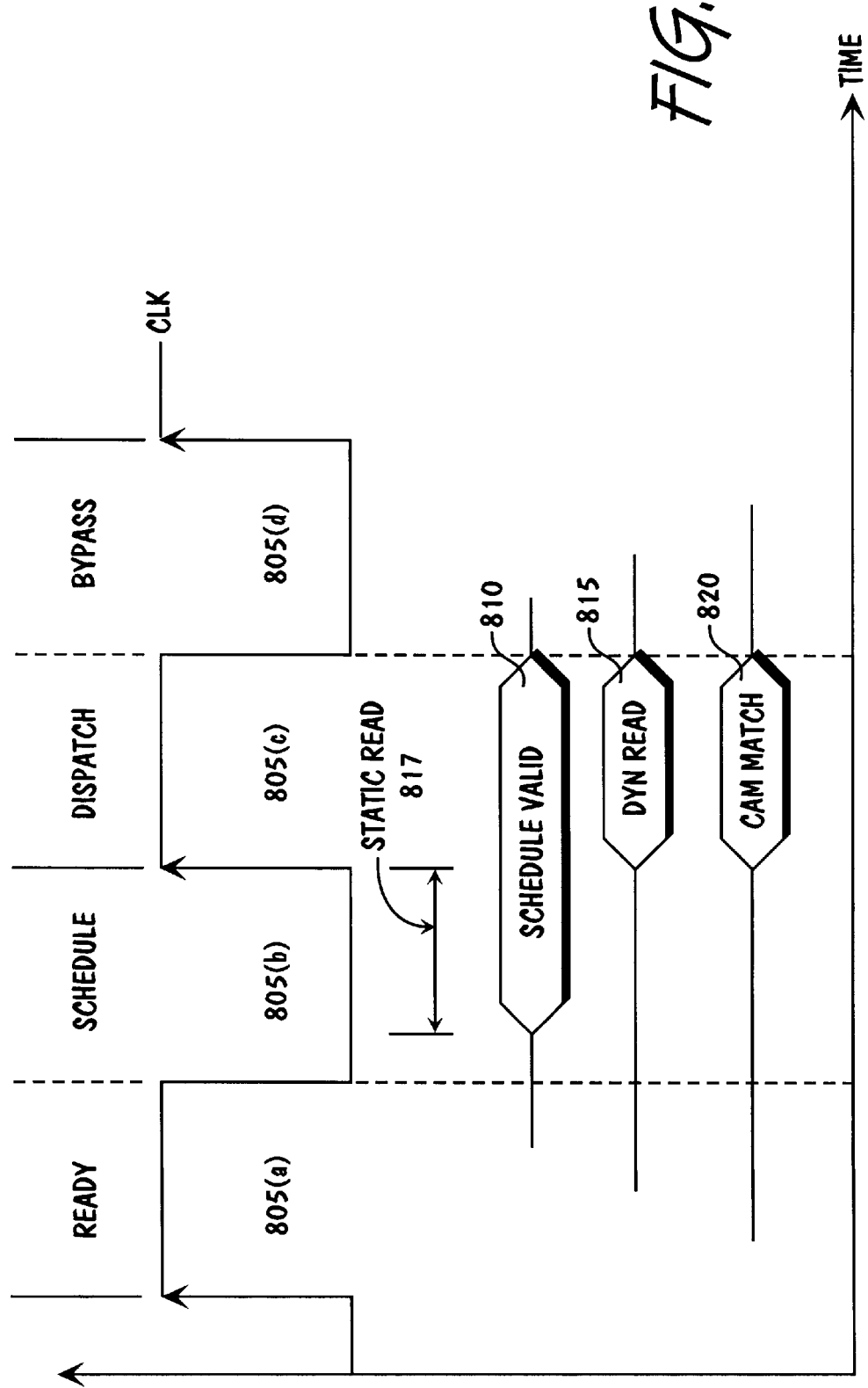
FIG. 7 is a timing diagram of the early read operation performed by the present invention.

Refer now to FIG. 7 and FIG. 4. As discussed above with reference to the pipeline stages of the ADD instruction, the present invention must perform an early read of the reservation station in order to supply PDSTs (ROB$_7$) in time for the ready determination of the SUB instruction. The circuitry to perform this early read operation is triggered based on the assertion of the schedule line of the ADD instruction for the particular execution unit selected for the ADD instruction. Therefore, the read of the reservation station array for the ADD's PDST begins within the schedule stage of the ADD pipeline. If this read operation were dynamic (e.g., clock based) then the result of the read operation would not be supplied until the next rising edge of the clock, which would be at the start of the dispatch stage of the ADD instruction (which is also the same time as the start of the ready determination stage of the SUB instruction). But this read of the ADD's PDST would be much too late for the ready determination stage of the SUB instruction because the SUB instruction needs the PDST information before the start of its ready determination stage.

It is appreciated that other alternative embodiments of the present invention for providing a non-clocked read function include a self-timed clock circuit to supply the PDST information and also a clocked skewed circuit to supply the PDST information. The above two alternative embodiments provide output information not in coincidence with transitions of the system clock.

Refer to FIG. 7 which illustrates the timing more clearly. Shown across clock cycles 805(a)–805(d) are the READY, SCHEDULE, DISPATCH, and potential BYPASS stages for the ADD instruction. During cycle 805(b), one of the five schedule lines for the ADD instruction will become valid during timing duration 810 as a scheduler selects an execution unit for the ADD instruction. This will cause the present invention static read circuitry to supply the PDST from the reservation station associated with the ADD's entry. This occurs at duration 817. During the dispatch of the ADD instruction at 805(c) a dynamic read operation 815 is performed by the present invention of the source data (if valid) within the reservation station in order to supply the execution unit with the required data. If the PDST column of the reservation station were implemented as a dynamic read memory (e.g., clocked memory) then the PDST would not be supplied until the start of cycle 805(c), which would be too late for the SUB's ready determination stage. Therefore, by providing a static read implementation, the present invention is able to supply the ADD's PDST during cycle 805(b) in time for the SUB's ready determination stage. At timing duration 820, the present invention performs a CAM2 match of the ADD's PDST against the sources of the valid entries of the reservation station. It is here that the ready determination for the SUB instruction is performed.

Figure 8:
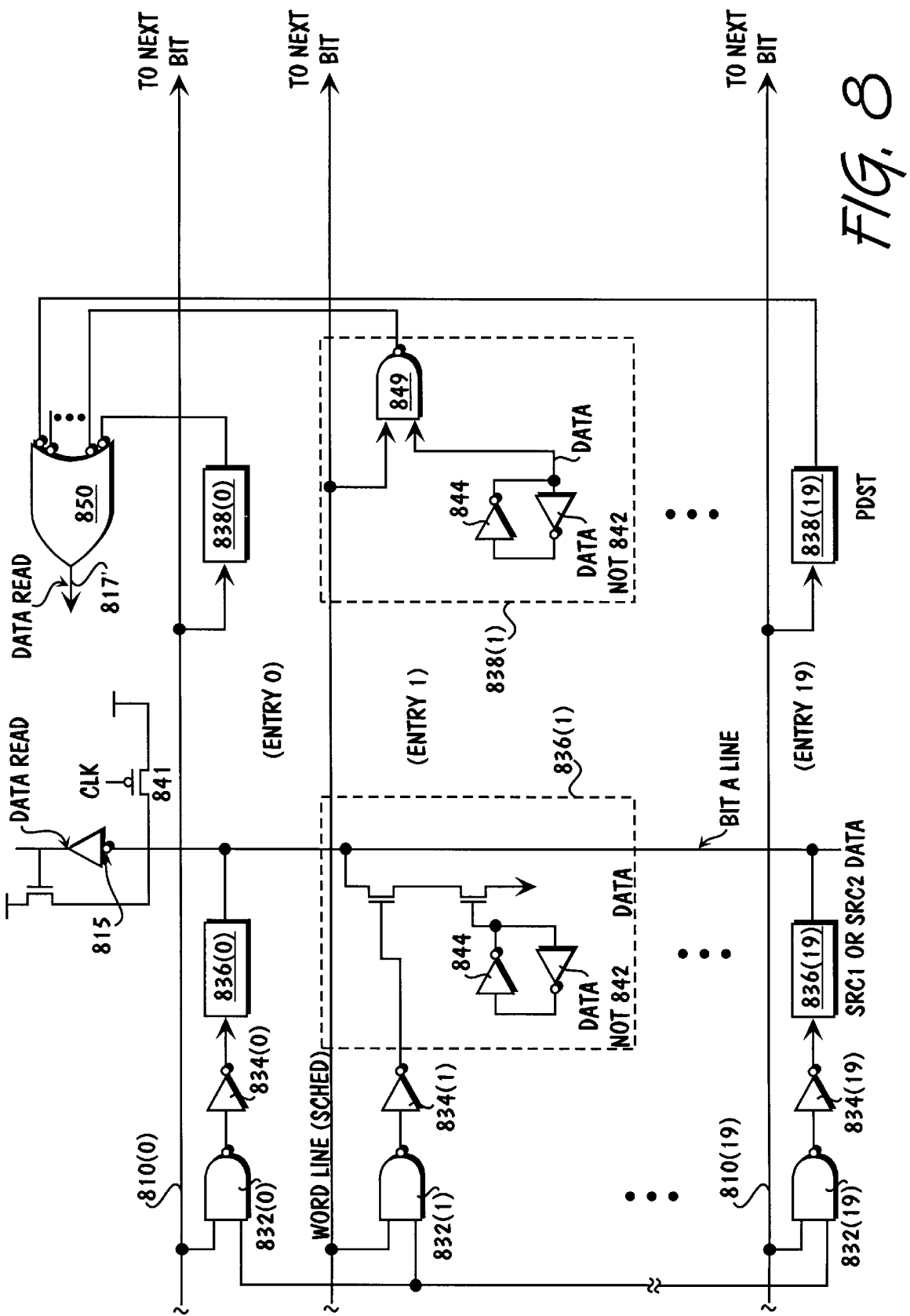
FIG. 8 illustrates the memory storage circuitry used to implement the early read operation.

FIG. 8 illustrates in detail the static (not clocked) and dynamic (clocked) memory storage implementations of the reservation station 118 of the present invention for a single bit of the PDST column and for a single bit of another column, either the SRC1 DATA or SRC2 DATA column or any other column that contains information that is not speed critical. The circuitry illustrated and discussed herein is replicated (1) for each bit of the PDST column, and also (2) for each of the five schedule lines for each entry of the reservation station 118. Further, since multiple instructions may be scheduled at the same time, the entire circuit as discussed above is replicated for each possible PDST supplied from the reservation station that is associated with a scheduled instruction. Therefore, FIG. 8 illustrates the logic for a given PDST read from the reservation station, for a given schedule line and for a given bit within the given PDST.

The clocked memory storage of the reservation station (e.g., the SRC1 and SRC2 DATA columns) is now explained. Line 810(0) represents the schedule line (D0) for a given execution unit (EU0) for entry 0 of the reservation station. Line 810(1) is the schedule line for EU0 for entry 1 and likewise line 810(19) is the schedule line for EU0 for entry 19. Only one entry of the RS 118 can be scheduled to execute on a given execution unit at any given time, so only one line of 810(0)–810(19) is asserted at any given time for a given execution unit. The circuitry for each entry of the reservation station is analogous to that of entry 1, which will be described in detail herein. The schedule line 810(1) becomes asserted during timing 810 (of FIG. 7) and indicates that entry 1 is scheduled to execute over EU0. This line 810(1) is fed to NAND gate 832(1) and the output of the system clock (clk) (of FIG. 7) is fed into the other input of NAND gate 832(1). The output of the NAND gate 832(1) is fed to inverter 834(1) and then to dynamic memory bit 836(1) which is composed of two transistors and inverters 844 and 842 configured to retain a memory bit in a well known fashion. The write ports to the memory bits are not shown and may be implemented in a variety of well known fashions. The bit 836(1) represents a bit within the SRC1 or SRC2 DATA columns of entry 1 of the RS 118. The memory bit is coupled to output line 815, which is precharged high by the clock signal applied through transistor 841; as such, and with respect to the NAND gate 832(1), the output of the dynamic memory cell 836(1) is in coincidence with the clock signal. As discussed above, this circuit is replicated across each bit of the source data columns to supply the data for a dispatched entry (here entry 1). The data associated with bit 836(1) will be made available over line 815 in coincidence with the rising edge of the clock at the start of cycle 805(c) (of FIG. 7) when the instruction in entry 1 is dispatched, and the data read from these memory cells is therefore "clocked" with this clock. Line 815 is inverted and the data is read out of the inverter as part of a weak sustainer circuit. This is the dynamic read implementation of the present invention. The data output of the dynamic read operation for the source data columns supplies the execution units.

It is appreciated that the above circuitry is replicated for each entry of the reservation station 118. The output of the bit 836(1) is tied to a precharged line 815 which is precharged by transistor 841 and the clock signal in a well known fashion. The bit data is supplied over line 815, ultimately from the reservation station to the EU0 when entry 1 is dispatched for execution. It is appreciated that the present invention utilizes the dynamic read (clock based) memory read technique for all columns of the reservation station 118 except for the PDST column.

Refer still to FIG. 8. The present invention also includes a static read cell that is not clock based and does not output information in coincidence with the system clock. This non-clock based memory is used for storing the PDST information. The schedule line 810(1) is fed into static memory call 838(1), which is composed of two inverters 848 and 846 configured to retain a memory bit in a well known fashion. The schedule line is fed into one input of NAND gate 849 and the other input of the NAND gate 849 is from the memory bit configuration. When the schedule line 810(1) is asserted, the memory bit of storage cell 838(1) is supplied into one input of a NOR gate 850. The same is true for all entries of the reservation station. The output of cells 838(0)–838(19) are sent to NOR gate 850 (or alternatively to a tree of gates that comprise a NOR function). The output of NOR gate 850 is inverted and sent over line 817' and ultimately sent to the CAM2 logic used to compute the ready determination of the next instruction. The outputs 817' of the NOR gates 850 for each bit of the PDST is fed to an input of MUX 220 (see FIG. 2). The logic shown in 838(1) for entry 1 is replicated for each bit required to contain the PDST information. Further, the logic is replicated for each entry of the reservation station. Finally, because the present invention may be implemented as a superscalar microprocessor, the total memory circuit is replicated for each PDST that needs to be read out from the reservation station early.

Since the schedule line 810(1) is asserted during cycle 805(*b*) (of FIG. 7) and since the cell 838(1) does not require the clock to supply its data, the bit from cell 838(1) may be supplied in advance of the rising edge of the clock at the start of cycle 805(*c*) which is in time for the ready determination of the next instruction. The static read cell does not supply its information clocked (e.g., in coincidence) with the clock transitions but rather is responsive to the schedule line. The static read implementation of cell 838(1) is used for the PDST column of the reservation station 118. Cell 838(1) represents but one bit, and thus the logic of FIG. 8 is replicated for each bit of the PDST column for entry 1 and for the other entries as well. The entire resultant circuit is also replicated for each PDST that must be read from the multiple instructions that can be dispatched at once. Therefore during interval 817 (of FIG. 7) the PDST from the reservation station of entry 1 is supplied over line 817' in advance of the next rising edge of the clock.

One alternative to the above early read operation of the present invention may include the insertion of an extra clock cycle into the pipeline stage of the SUB instruction (that would delay the ready determination stage) so that a dynamic read of the PDST column could be performed in time for the ready determination stage of the SUB instruction. However, this would not yield the maximum throughput for back-to-back execution of single cycle instructions and thus is not an acceptable solution.

On the other hand, the present invention's early read of the PDSTs of the reservation station using non-clocked static memory allows back-to-back execution of single cycle instructions that may be data dependent. The PDST from the ADD instruction is supplied to the ready determination state of the SUB instruction and the data returned by the ADD instruction will be routed to the input of the execution unit scheduled for the SUB instruction via the MUX 260 (in the fashion as discussed above). The present invention thus allows the SUB instruction to fully execute while only consuming one clock cycle longer than the processing time of the ADD instruction, even though the SUB instruction is data dependent on the ADD instruction. This is maximum throughput for back-to-back scheduling of instructions that are data dependent on a single cycle instructions.

The present invention has been described as a means for back-to-back scheduling of dependent instructions under the assumption that all but one source operand is available to each instruction. This condition has been illustrated by setting the source valid bits corresponding to the available operands. A source valid bit may be set using a number of methods, including use of the writeback data valid bit as described above. In addition, three other mechanisms will be described for setting the valid bit when source data becomes available before a dependent instruction is written to the reservation station. First, if the available operand is an immediate value, e.g., the second value in add (eax,1), then the RAT 114 causes the RS 118 to set the S2V bit upon issue of the instruction to the RS 118. Second, if the source operand is the result of an operation that has already been executed and retired, then the corresponding entry in the RAT 114 will have its RRFV bit set. This bit is also passed to the RS 118, and will cause the RS 118 to set the source valid bit. Third, if the source operand is the result of an operation that has already been executed but has not yet retired, then the RAT 114 will send the PSRC of the source operand to the ROB, which reads the result and passes it to the RS, again setting the source valid bit.

Figure 9:
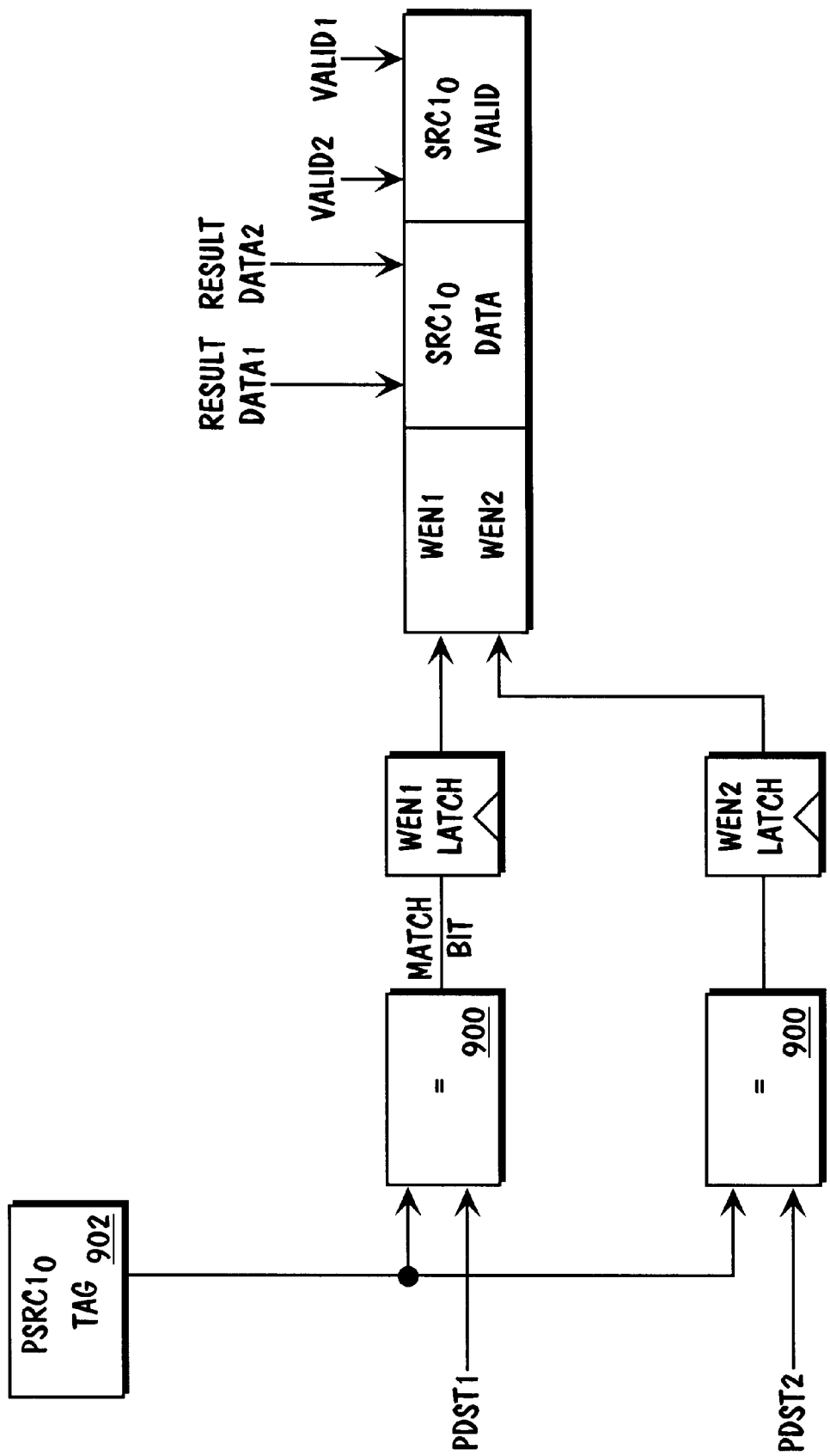
FIG. 9 illustrates a multiported embodiment of a content addressable memory of the present invention.

It should be kept in mind that the preferred embodiment of the present invention is a superscalar microprocessor, i.e., multiple instructions may execute within the same processor clock cycle. Thus, in the example of FIG. 2, both the first and second operands may become available at the same time due to the simultaneous execution of multiple instructions providing both operands. To accommodate the superscalar case, each CAM of FIG. 2 may represent a multi-ported CAM that receives a PDST from each micro instruction that will be writing back its result. FIG. 9 illustrates a multi-ported embodiment of a CAM for the first source operand of the first RS entry. Each incoming PDST (PDST1 and PDST2 in this example) is input to a corresponding comparator 900 so that multiple PDSTs are compared to the same source operand tag 902. Each comparator 900 and its resulting match bit are thus associated with a particular PDST and its source (e.g., execution unit). Similarly, each RS entry includes a number of write enables (WEN 1 and WEN 2), each for enabling the receipt of writeback data (RESULT DATA1 and RESULT DATA2, respectively) and a valid bit (VALID1 and VALID2, respectively), from the associated source. Consequently the match bits enable the writing of data and valid bits to the correct source operand of the correct RS entry from the correct source.

Figure 10:
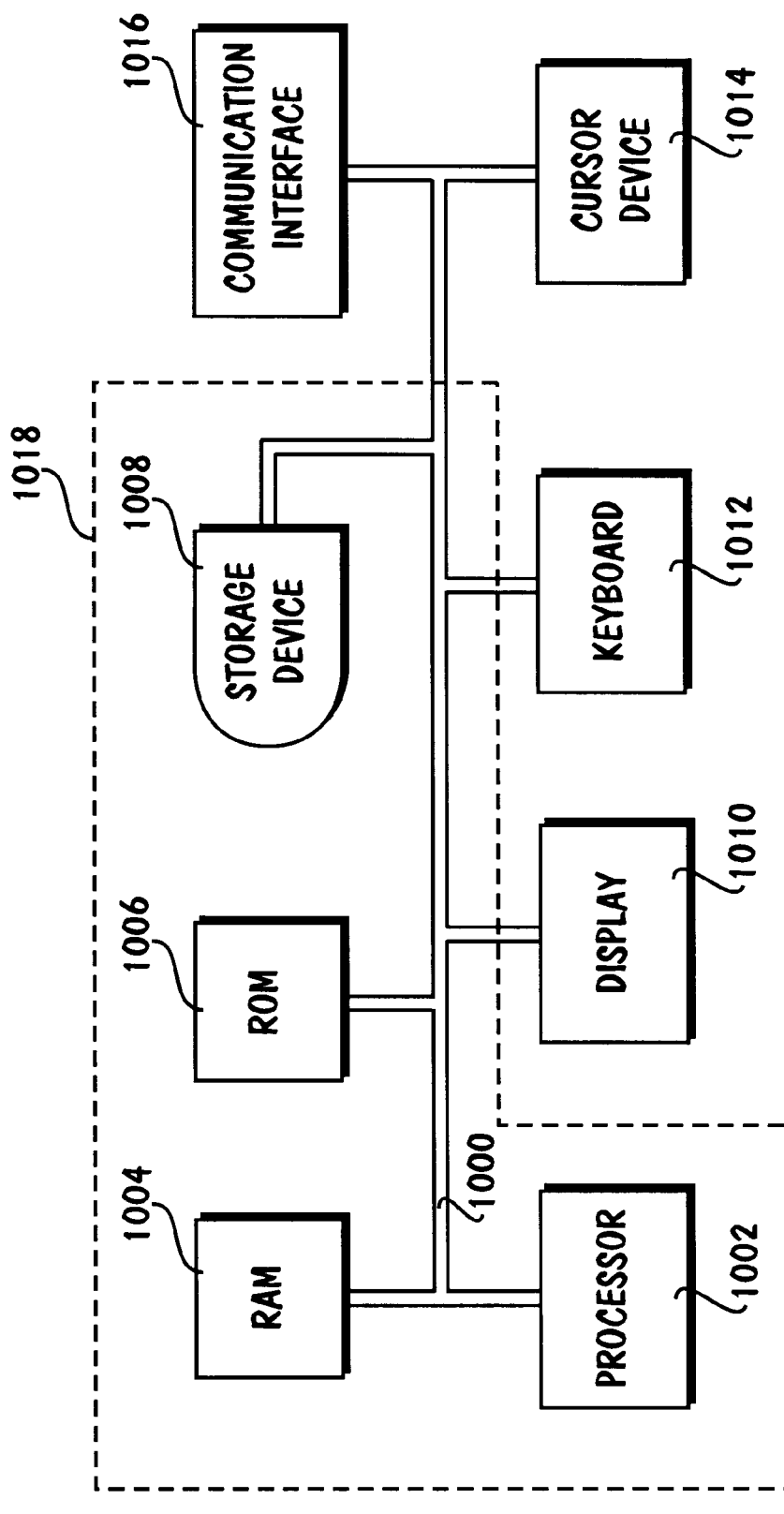
FIG. 10 illustrates a computer system incorporating the processor of the present invention.

The microprocessor of the present invention may be added to a general purpose computer system as shown in FIG. 10. Generally the computer system of the present invention comprises an address/data bus 1000 for communicating information, a central processor 1002 coupled with the bus for processing information and executing instructions, a random access memory 1004 coupled with the bus 1000 for storing information and instructions for the central processor 1002, and a read only memory 1006 coupled with the bus 1000 for storing static information and instructions for the processor 1002. Also available for interface with the computer system of the present invention is a data storage device 1008 such as a magnetic disk or optical disk drive, which may be communicatively coupled with the bus 1000, for storing data and instructions.

The display device 1010 utilized with the computer system of the present invention may be a liquid crystal device, cathode ray tube, or other display device suitable for creating graphic images and/or alphanumeric characters recognizable to the user. The computer system may also contain an alphanumeric input device 1012 including alphanumeric and function keys coupled to the bus 1000 for communicating information and command selections to the central processor 1002, and a cursor control device 1014 coupled to the bus 1000 for communicating user input information and command selections to the central processor 1002 based on a user's hand movement. The cursor control device 1014 allows the network user to dynamically signal the two-dimensional movement of a visible symbol (pointer) on a display screen of the display device 1010. Many implementations of the cursor control device are known in the art, including a track ball, mouse, joystick or special keys on the alphanumeric input device 1012, all capable of signaling movement in a given direction or manner of displacement.

The computer system of FIG. 10 also contains an input/output device 1016 coupled to the bus 1000 for communicating information to and from the commuter system. The communication device 1016 may be composed of a serial or parallel communication port or may be a communication modem. It is appreciated that such a communication device 1016 may provide an interface between the bus 1000 and the user interface devices (keyboard 1012, cursor 1014, display 1010) of the computer system. In this case, the user interface devices will reside within a terminal device which is coupled to the communication device 1016 so that the processor 1002, the RAM 1004, the ROM 1006 and storage device 1008 may communicate with the terminal. The components 1002, 1004, 1006 and 1008 may be implemented on a single board or a computer chassis 1018, which is then coupled by a bus 1000 to the other components of the computer system.

It will be appreciated that various modifications and alterations might be made by those skilled in the art without departing from the spirit and scope of the present invention. For example, the use of the Intel architecture by the present invention is but one implementation. The present invention applies to other processor designs and instruction sets, as well. Further, the present invention may be physically embodied in a variety of packages. The present invention may be built into one integrated circuit package or have its functionality spread over a number of chips, or be implemented by an emulator. Moreover, the invention may be constructed on chips of different materials, such as silicon or gallium arsenide. Finally, although the present invention allows speculative out-of-order execution and is superscalar, aspects of the present invention operate effectively within pipelined processors that perform neither speculative execution, out-of-order execution, nor superscalar operation. The invention should, therefore, be measured in terms of the claims which follow.

We claim:

1. In a processor having at least one execution unit for executing a plurality of instructions to thereby generate execution results, each instruction specifying an opcode and being associated with at least one source operand location designator indicating a storage location of a source operand of said each instruction in a storage buffer, each instruction further associated with a destination location designator indicating a storage location in the storage buffer of the result of the execution of said each instruction, wherein each of at least one dependent instruction of the plurality of instructions is dependent upon at least one source instruction of the plurality of instructions such that at least one source operand location designator of the at least one dependent instruction is identical to a corresponding destination location designator of the at least one source instruction, the at least one source operand location designator of the at least one dependent instruction being stored in a memory device of the processor, the memory device including a content addressable memory for storing the source operand location designators of the at least one dependent instruction as tags of the content addressable memory, a method for determining the availability of a source operand of a dependent instruction for dispatch of the dependent instruction to an execution unit, the method comprising the steps of:

receiving a first destination location designator of a first result, the first result being the result of the execution of a first source instruction by a first execution unit;

determining a first condition, the first condition being whether the received first destination location designator is identical to any of the stored source operand location designators of the at least one dependent instruction, each dependent instruction that satisfies the first condition thereby being a dependent instruction that will have at least one source operand available for dispatch of the dependent instruction to an execution unit, wherein said determining step comprises the step of:

associatively comparing the first destination location designator with the stored source operand location designators of the dependent instructions to determine which of the dependent instructions are dependent instructions satisfying the first condition.

2. The method of claim 1, further comprising the steps of:

if the first condition is satisfied, determining a second condition, the second condition being whether all of the other source operands of any of the dependent instructions that satisfy the first condition will be available for dispatch, each dependent instruction satisfying the first and second conditions being denoted a ready instruction;

dispatching a first ready instruction to a second execution unit for execution of the first ready instruction.

3. The method of claim 2, the step of determining the second condition including the steps of:

determining whether a source operand of a dependent instruction that satisfies the first condition is an immediate value; and if the source operand of a dependent instruction that satisfies the first condition is an immediate value, setting a source valid bit corresponding to the source operand, thereby indicating that that source operand is available.

4. The method of claim 2, the step of determining the second condition including the step of determining whether at least one of the other stored source operand location designators of any of the dependent instructions that satisfy the first condition is identical to a second destination location designator of a second destination location designator of a second result, the second result being the result of the execution of a second source instruction.

5. The method of claim 4, wherein the first and second source instructions are executed within a same processor clock cycle.

6. The method of claim 5, the determining step further comprising the step of:

associatively comparing the second destination location designator with the stored source operand location designators of the dependent instructions that satisfy the first condition to determine which of the dependent instructions have at least one other source operand available for dispatch.

7. The method of claim 4, wherein the second result is stored in the storage buffer after execution of the second source instruction, the step of determining the second condition comprising steps of:

upon allocation of a dependent instruction to a reservation station, determining whether the second result corresponds to a source operand of the allocated instruction;

if the second result corresponds to a source operand of the dependent instruction, storing the second result from the storage buffer into at least one ready source data storage location associated with the allocated dependent instruction, each ready storage location corresponding to one of the allocated dependent instruction source operands that corresponds to the second result; and setting at least one source valid bit, each source valid bit corresponding to the at least one ready source data storage location.

8. The method of claim 2, further comprising the step of:

providing the first result from a result data output of the first execution unit to at least one source input of the second execution unit, the first result being at least one source operand of the first ready instruction.

9. The method of claim 8, wherein the first and second execution units are the same execution unit.

10. The method of claim 8, further comprising the step of:

dispatching a second ready instruction to a third execution unit for execution of the second ready instruction.

11. The method of claim 10, further comprising the step of:

providing the first result from a result data output of the first execution unit to at least one source input of the third execution unit, the first result being at least one source operand of the second ready instruction.

12. The method of claim 2, further comprising the steps of:

before dispatching the first ready instruction, determining that the first ready instruction and a second ready instruction are to be dispatched to the second execution unit;

selecting the first ready instruction for dispatch to the second execution unit;

after dispatching the first ready instruction, dispatching the second ready instruction to the second execution unit.

13. The method of claim 12, further comprising the steps of:

before dispatching the first ready instruction, latching the first destination location designator in a latch;

during dispatch of the first ready instruction, determining whether the second ready instruction satisfies the first condition in response to the latched first destination location designator, and determining whether the second ready instruction satisfies the second condition; and selecting the second ready instruction for dispatch if the second ready instruction satisfies the first and second conditions.

14. The method of claim 13, further comprising the steps of: if the first and second conditions are satisfied:

storing the first result in at least one ready source data storage location, each ready storage location corresponding to one of the source operand location designators that is identical to the first destination location designator.

15. The method of claim 1, wherein the receiving step comprises the steps of:

dispatching the first source instruction to the first execution unit; and outputting the first destination location designator from the first execution unit to the memory device before outputting the first result from the first execution unit.

16. The method of claim 1, wherein a destination designator storage location stores the first destination location designator, the destination designator storage location corresponding to the first source instruction, the receiving step comprising the step of:

reading the first destination location designator from the first destination designator storage location.

17. In a processor having at least one execution unit for executing a plurality of instructions to thereby generate execution results, each instruction specifying an opcode and being associated with at least one source operand location designator indicating a storage location of a source operand of said each instruction in a storage buffer, each instruction further associated with a destination location designator indicating a storage location in the storage buffer of the result of the execution of said each instruction, wherein each of at least one dependent instruction of the plurality of instructions is dependent upon at least one source instruction of the plurality of instructions such that at least one source operand location designator of the at least one dependent instruction is identical to a corresponding destination location designator of the at least one source instruction, the at least one source operand location designator of the at least one dependent instruction being stored in a memory device of the processor, the memory device including a content addressable memory for storing the source operand location designators of the at least one dependent instruction as tags of the content addressable memory, a method for determining the availability of a source operand of a dependent instruction for dispatch of the dependent instruction to an execution unit, the method comprising the steps of:

receiving a first destination location designator of a first result, the first result being the result of the execution of a first source instruction by a first execution unit;

determining a first condition, the first condition being whether the received first destination location designator is identical to any of the stored source operand location designators of the at least one dependent instruction, each dependent instruction that satisfies the first condition thereby being a dependent instruction that will have at least one source operand available for dispatch of the dependent instruction to an execution unit, wherein said determining step comprises the step of associatively comparing the first destination location designator with the stored source operand location designators of the dependent instructions to determine which of the dependent instructions are dependent instructions satisfying the first condition;

latching the first destination location designator in a latch;

if the first condition is satisfied, determining a second condition, the second condition being whether all of the other source operands of any of the dependent instructions that satisfy the first condition will be available for dispatch, each dependent instruction satisfying the first and second conditions being denoted a ready instruction:

determining that the first ready instruction and a second ready instruction are to be dispatched to the second execution unit;

selecting the first ready instruction for dispatch to the second execution unit;

dispatching a first ready instruction to a second execution unit for execution of the first ready instruction, wherein during dispatch of the first ready instruction, determining whether the second ready instruction satisfies the first condition in response to the latched first destination location designator, and determining whether the second ready instruction satisfies the second condition;

selecting the second ready instruction for dispatch if the second ready instruction satisfies the first and second conditions; and dispatching the second ready instruction to the second execution unit for execution of the second ready instruction;

storing the first result in at least one ready source data storage location if the first and second conditions are satisfied, each ready storage location corresponding to one of the source operand location designators that is identical to the first destination location designator; and after the storing step, providing the first result to the second execution unit executing the second ready instruction, the first result being provided from the at least one ready source data storage location that corresponds to the second ready instruction.

18. The method of claim 17, further comprising the steps of:

during the storing step, setting at least one source valid bit, each source valid bit corresponding to one of the source operand location designators that is identical to the first destination location designator;

before dispatch of the second ready instruction, determining that the second ready instruction and a third ready instruction are to be dispatched to the second execution unit;

during dispatch of the second ready instruction, determining whether the third ready instruction satisfies the first condition in response to at least one source valid bit corresponding to at least one source operand of the third ready instruction, and determining whether the third ready instruction satisfies the second condition; and selecting the third ready instruction for dispatch to the second execution unit if the third ready instruction satisfies the first and second conditions.

19. A processor for processing a plurality of instructions, each instruction specifying an opcode and being associated with at least one source operand location designator indicating the storage location of a source operand of said each instruction in a storage buffer, each instruction further associated with a destination location designator indicating the storage location in the storage buffer of a result of the execution of said each instruction, wherein each of at least one dependent instruction of the plurality of instructions is dependent upon at least one source instruction of the plurality of instructions such that at least one source operand location designator of the at least one dependent instruction is identical to a corresponding destination location designator of the at least one source instruction, the processor comprising:

at least one execution unit for executing instructions, each execution unit having at least one source input, each source input for receiving a source operand, each execution unit further having a result data output for outputting the result of the execution of an instruction, a first execution unit of the at least one execution unit for outputting a first result of the execution of a first source instruction, wherein a first destination location designator indicates the storage location of the first result in the storage buffer;

a reservation station array having:
at least one row corresponding to an instruction, each row having a plurality of fields including an opcode field for storing the opcode of the corresponding instruction, each row further having at least one source data field for storing a source operand of the corresponding instruction;

at least one associative array having at least one array line, each array line corresponding to a row, each array line for storing the at least one source operand location designator of the at least one source operand of a dependent instruction of the corresponding row, the at least one associative array having an input for receiving the first destination location designator, the associative array having circuitry for providing at least one match signal in response to a match between the received first destination location designator and a stored source operand location designator;

a ready logic circuit for determining that at least one row is ready for dispatch to an execution unit as a function of the at least one match signal; and an execution bypass multiplexer for providing th e first result from the result data output of the first execution unit to the source input of an execution unit to which a ready row is to be dispatched, the first result being provided when the outputting of the first result from the first execution unit occurs after the dis patch of the ready row.

20. The processor of claim 19, the at least one associative array further having an input for receiving a second destination location designator of a second result of the execution of a second source instruction by a second execution unit, the associative array further having circuitry for providing at least one second match signal in response to a match between the received second destination location designator and at least one stored source operand location designator.

21. The processor of claim 20, wherein
the ready logic circuit determines readiness as a function of the at least one match signal and the at least one second match signal, and the execution bypass multiplexer further includes circuitry for providing the second result from the result data output of the second execution unit to the source input of the execution unit to which the ready row is to be dispatched, the second result being provided when the outputting of the second result from the second execution unit occurs after the dispatch of the ready row.

22. The processor of claim 19, wherein the ready logic circuit determines the readiness of the at least one row as a function of the at least one match signal and at least one source valid bit, each source valid bit corresponding to a source operand.

23. The processor of claim 22, further comprising a register alias table circuit for setting the source valid bit corresponding to an immediate source operand upon allocation of the at least one row to the reservation station.

24. The processor of claim 22,
the storage buffer for storing a second result of the execution of a second source instruction, wherein
if the second result corresponds to a source operand of the allocated instruction, the storage buffer provides the second result to the at least one source data field of the allocated instruction, and the source valid bit associated with each source data field receiving the second result is set.

25. The processor of claim 24, wherein the storage buffer comprises:
   a reorder buffer for storing the second result of the speculative execution of the second source instruction; and
   a real register file for storing the second result after retirement of the second source instruction.

26. The processor of claim 19, wherein the at least one associative array comprises a first and a second associative array, each array line of the second associative array for storing the same source operand location designators stored in a corresponding array line of the first associative array, the processor further comprising a latch for latching the first destination location designator, and for providing the latched first destination location designator to the input of the second associative array.

27. The processor of claim 26, each source data field having a write enable input for enabling the writing of the first result into the source data field, wherein each match signal of the second associative array is transmitted to the write enable input of each source data field corresponding to a source operand location designator that matches the latched first destination location designator.

28. The processor of claim 26, wherein the ready logic circuit determines that a first ready row and a second ready row are ready for dispatch to a second execution unit, the processor further comprising a scheduler circuit, coupled to the ready logic circuit, for selecting the first ready row for dispatch to the second execution unit.

29. The processor of claim 28, further comprising a ready disable logic circuit for disabling the ready logic circuit of a ready row after the ready row has been selected for dispatch.

30. The processor of claim 29, wherein, after the ready logic circuit of the first ready row has been disabled, the ready logic circuit determines that the second row is ready for dispatch to the second execution unit as a function of the at least one match signal provided by the second associative array.

31. A processor for processing a plurality of instructions, each instruction specifying an opcode and being associated with at least one source operand location designator indicating the storage location of a source operand of said each instruction in a storage buffer, each instruction further associated with a destination location designator indicating the storage location in the storage buffer of a result of the execution of said each instruction, wherein each of at least one dependent instruction of the plurality of instructions is dependent upon at least one source instruction of the plurality of instructions such that at least one source operand location designator of the at least one dependent instruction is identical to a corresponding destination location designator of the at least one source instruction, the processor comprising:
   at least one execution unit that executes instructions, each execution unit having at least one source input, each source input for receiving a source operand, each execution unit further having a result data output for outputting the result of the execution of an instruction, a first execution unit of the at least one execution unit for outputting a first result of the execution of a first source instruction, wherein a first destination location designator indicates the storage location of the first result in the storage buffer;
   a reservation station array having:
      at least one row corresponding to an instruction, each row having a plurality of fields including an opcode field for storing the opcode of the corresponding instruction, each row further having at least one source data field for storing a source operand of the corresponding instruction;
   at least one associative array having at least one array line, each array line corresponding to a row, each array line for storing the at least one source operand location designator of the at least one source operand of a dependent instruction of the corresponding row, the at least one associative array having an input for receiving the first destination location designator, the associative array having circuitry for providing at least one match signal in response to a match between the received first destination location designator and a stored source operand location designator, wherein the at least one associative array comprises a first and a second associative array, each array line of the second associative array for storing the same source operand location designators stored in a corresponding array line of the first associative array;
   a latch that latches the first destination location designator, and provides the latched first destination location designator to the input of the second associative array;
   a ready logic circuit that determines that at least one row is ready for dispatch to an execution unit as a function of the at least one match signal, wherein the ready logic circuit determines that a first ready row and a second ready row are ready for dispatch to a second execution unit, wherein, after the ready logic circuit of the first ready row has been disabled, the ready logic circuit determines that the second row is ready for dispatch to the second execution unit as a function of the at least one match signal provided by the second associative array;
   a scheduler circuit, coupled to the ready logic circuit, that selectes the first ready row for dispatch to the second execution unit;
   a ready disable logic circuit that disables the ready logic circuit of a ready row after the ready row has been selected for dispatch;
   an execution bypass multiplexer that provides the first result from the result data output of the first execution unit to the source input of an execution unit to which a ready row is to be dispatched, the first result being provided when the outputting of the first result from the first execution unit occurs after the dispatch of the ready row; and
   means for storing the first result into each source data field having a write enable input that has received a match signal, the first result being provided to the source input of the second execution unit from the source data field of the second ready row.

32. A processor for processing a plurality of instructions, each instruction specifying an opcode and being associated with at least one source operand location designator indicating the storage location of a source operand of said each instruction in a storage buffer, each instruction further associated with a destination location designator indicating the storage location in the storage buffer of a result of the execution of said each instruction, wherein each of at least one dependent instruction of the plurality of instructions is dependent upon at least one source instruction of the plurality of instructions such that at least one source operand location designator of the at least one dependent instruction is identical to a corresponding destination location designator of the at least one source instruction, the processor comprising:

at least one execution unit that executes instructions, each execution unit having at least one source input, each source input for receiving a source operand, each execution unit further having a result data output for outputting the result of the execution of an instruction, a first execution unit of the at least one execution unit for outputting a first result of the execution of a first source instruction, wherein a first destination location designator indicates the storage location of the first result in the storage buffer;

a reservation station array having:
  at least one row corresponding to an instruction, each row having a plurality of fields including an opcode field for storing the opcode of the corresponding instruction, each row further having at least one source data field for storing a source operand of the corresponding instruction;

at least one associative array having at least one array line, each array line corresponding to a row, each array line for storing the at least one source operand location designator of the at least one source operand of a dependent instruction of the corresponding row, the at least one associative array having an input for receiving the first destination location designator, the associative array having circuitry for providing at least one match signal in response to a match between the received first destination location designator and a stored source operand location designator, wherein the at least one associative array comprises a first and a second associative array, each array line of the second associative array for storing the same source operand location designators stored in a corresponding array line of the first associative array;

a latch that latches the first destination location designator, and provides the latched first destination location designator to the input of the second associative array;

a ready logic circuit that determines that at least one row is ready for dispatch to an execution unit as a function of the at least one match signal, wherein the ready logic circuit determines that a first ready row and a second ready row are ready for dispatch to a second execution unit, wherein, after the ready logic circuit of the first ready row has been disabled, the ready logic circuit determines that the second row is ready for dispatch to the second execution unit as a function of the at least one match signal provided by the second associative array, wherein the ready logic circuit determines that the second ready row and a third ready row are ready for dispatch to the second execution unit;

a scheduler circuit, coupled to the ready logic circuit, that selectes the first ready row for dispatch to the second execution unit, the scheduler circuit selects the second ready row for dispatch to the second execution unit;

a ready disable logic circuit that disables the ready logic circuit of a ready row after the ready row has been selected for dispatch the ready disable logic circuit thereafter disables the ready logic circuit of the second ready row, each row further comprising at least one source valid bit, each source valid bit corresponding to a source data field;

an execution bypass multiplexer that provides the first result from the result data output of the first execution unit to th e source input of an execution unit to which area dy row is to be dispatched, the first result being provided when the outputting of the first result from the first execution unit occurs after the dispatch of the ready row; and means for setting each source valid bit corresponding to a write enabled source data field after execution of the first source instruction, wherein the ready logic determines that the third ready row is ready for dispatch as a function of the source valid bit of the third ready row.

33. A processor for processing a plurality of instructions, each instruction specifying an opcode and being associated with at least one source operand location designator indicating the storage location of a source operand of said each instruction in a storage buffer, each instruction further associated with a destination location designator indicating the storage location in the storage buffer of a result of the execution of said each instruction, wherein each of at least one dependent instruction of the plurality of instructions is dependent upon at least one source instruction of the plurality of instructions such that at least one source operand location designator of the at least one dependent instruction is identical to a corresponding destination location designator of the at least one source instruction, the processor comprising:

at least one execution unit that executes instructions, each execution unit having at least one source input, each source input for receiving a source operand, each execution unit further having a result data output for outputting the result of the execution of an instruction, a first execution unit of the at least one execution unit for outputting a first result of the execution of a first source instruction, wherein a first destination location designator indicates the storage location of the first result in the storage buffer;

a reservation station array having:
  at least one row corresponding to an instruction, each row having a plurality of fields including an opcode field for storing the opcode of the corresponding instruction, each row further having at least one source data field for storing a source operand of the corresponding instruction, each row of the reservation station array further having a destination location designator field for storing the destination location designator associated with the instruction corresponding to the row;

at least one associative array having at least one array line, each array line corresponding to a row, each array line for storing the at least one source operand location designator of the at least one source operand of a dependent instruction of the corresponding row, the at least one associative array having an input for receiving the first destination location designator, the associative array having circuitry for providing at least one match signal in response to a match between the received first destination location designator and a stored source operand location designator;

a ready logic circuit that determines that at least one row is ready for dispatch to an execution unit as a function of the at least one match signal; and an execution bypass multiplexer that provides the first result from the result data output of the first execution unit to the source input of an execution unit to which a ready row is to be dispatched, the first result being provided when the outputting of the first result from the first execution unit occurs after the dispatch of the ready row; and a destination bypass multiplexer having a first input for receiving at least one result data output of at least one execution unit, the destination bypass multiplexer further having a second input for receiving the first destination location designator from the destination location designator field of the row corresponding to the first source instruction, the destination bypass multiplexer further having an output coupled to the input of the at least one associative array, wherein the destination bypass multiplexer provides the first destination location designator from the first input if the first source instruction requires a first number of processor clock cycles for execution, the destination bypass multiplexer provides the first destination location designator from the second input if the first source instruction requires a second number of processor clock cycles for execution, the second number being greater than the first number.

34. A computer system comprising:

a bus for communicating information;

a memory storage device, coupled to th e bus, for storing instructions and data; and a processor, coupled to the bus, for processing a plurality of instructions, each instruction specifying an opcode and being associated with at least one source operand location designator indicating the storage location of a source operand, each instruction further associated with a destination location designator indicating the storage location of a result of the execution of the instruction, wherein each of at least one dependent instruction of the plurality of instructions is dependent upon at least one source instruction of the plurality of instructions such that at least one source operand location designator of the at least one dependent instruction is identical to a corresponding destination location designator of the at least one source instruction, the processor comprising:

at least one execution unit for executing instructions, each execution unit having at least one source input, each source input for receiving a source operand, each execution unit further having a result data output for outputting the result of the execution of an instruction, the at least one execution unit including a first execution unit for outputting a first result of the execution of a first source instruction, wherein a first destination location designator indicates the storage location of the first result;

a reservation station array having:

at least one row corresponding to an instruction, each row having a plurality of fields including an opcode field for storing the opcode of the corresponding instruction, each row further having at least one source data field for storing a source operand of the corresponding instruction;

at least one associative array having at least one array line, each array line corresponding to a row, each array line for storing the at least one source operand location designator of the at least one source operand of a dependent instruction of the corresponding row, the at least one associative array having an input for receiving the first destination location designator, the associative array having circuitry for providing at least one match signal in response to a match between the received first destination location designator and a stored source operand location designator;

a ready logic circuit for determining that at least one row is ready for dispatch to an execution unit as a function of the at least one match signal; and an execution bypass multiplexer for providing the first result from the result data output of the first execution unit to the source input of an execution unit to which a ready row is to be dispatched, the first result being provided when the outputting of the first result from the first execution unit occurs after the dispatch of the ready row.

35. The computer system of claim 34, wherein the at least one associative array comprises a first and a second associative array, each array line of the second associative array for storing the same source operand location designators stored in a corresponding array line of the first associative array, the processor further comprising a latch for latching the first destination location designator, and for providing the latched first destination location designator to the input of the second associative array.

36. The computer system of claim 35, each source data field having a write enable input for enabling the writing of the first result into the source data field, wherein each match signal of the second associative array is transmitted to the write enable input of each source data field corresponding to a source operand location designator that matches the latched first destination location designator.

37. The computer system of claim 35, wherein the ready logic circuit determines that a first ready row and a second ready row are ready for dispatch to a second execution unit, the processor further comprising a scheduler circuit, coupled to the ready logic circuit, for selecting the first ready row for dispatch to the second execution unit.

38. The computer system of claim 37, further comprising a ready disable logic circuit for disabling the ready logic circuit of a ready row after the ready row has been selected for dispatch.

39. The computer system of claim 38, wherein, after the ready logic circuit of the first ready row has been disabled, the ready logic circuit determines that the second row is ready for dispatch to the second execution unit as a function of the at least one match signal provided by the second associative array.

40. A computer system comprising:

a bus for communicating information;

a memory storage device, coupled to the bus, that stores instructions and data; and a processor, coupled to the bus, that processes a plurality of instructions, each instruction specifying an opcode and being associated with at least one source operand location designator indicating the storage location of a source operand, each instruction further associated with a destination location designator indicating the storage location of a result of the execution of the instruction, wherein each of at least one dependent instruction of the plurality of instructions is dependent upon at least one source instruction of the plurality of instructions such that at least one source operand location designator of the at least one dependent instruction is identical to a corresponding destination location designator of the at least one source instruction, the processor comprising:

at least one execution unit that executes instructions, each execution unit having at least one source input, each source input for receiving a source operand. each execution unit further having a result data output for outputting the result of the execution of an instruction, the at least one execution unit including a first execution unit for outputting a first result of the execution of a first source instruction, wherein a first destination location designator indicates the storage location of the first result;

a reservation station array having;
  at least one row corresponding to an instruction, each row having a plurality of fields including an opcode field for storing the opcode of the corresponding instruction, each row further having at least one source data field for storing a source operand of the corresponding instruction;

at least one associative array having at least one array line, each array line corresponding to a row, each array line for storing the at least one source operand location designator of the at least one source operand of a dependent instruction of the corresponding row, the at least one associative array having an input for receiving the first destination location designator, the associative array having circuitry for providing at least one match signal in response to a match between the received first destination location designator and a stored source operand location designator, wherein the at least one associative array comprises a first and a second associative array, each array line of the second associative array for storing the same source operand location designators stored in a corresponding array line of the first associative array;

a latch that latches the first destination location designator, and provides the latched first destination location designator to the input of the second associative array;

a ready logic circuit that determines that at least one row is ready for dispatch to an execution unit as a function of the at least one match signal, wherein the ready logic circuit determines that a first ready row and a second ready row are ready for dispatch to a second execution unit;

a scheduler circuit, coupled to the ready logic circuit, that selects the first ready row for dispatch to the second execution unit;

a ready disable logic circuit for disabling the ready logic circuit of a ready row after the ready row has been selected for dispatch, wherein, after the ready logic circuit of the first ready row has been disabled, the ready logic circuit determines that the second row is ready for dispatch to the second execution unit as a function of the at least one match signal provided by the second associative array:

an execution bypass multiplexer that provides the first result from the result data output of the first execution unit to the source input of an execution unit to which a ready row is to be dispatched, the first result being provided when the outputting of the first result from the first execution unit occurs after the dispatch of the ready row; and means for storing the first result into each source data field having a write enable input that has received a match signal, the first result being provided to the source input of the second execution unit from the source data field of the second ready row.

41. A computer system comprising:
a bus for communicating information;
a memory storage device, coupled to the bus, that stores instructions and data; and
a processor, coupled to the bus, that processes a plurality of instructions, each instruction specifying an opcode and being associated with at least one source operand location designator indicating the storage location of a source operand, each instruction further associated with a destination location designator indicating the storage location of a result of the execution of the instruction, wherein each of at least one dependent instruction of the plurality of instructions is dependent upon at least one source instruction of the plurality of instructions such that at least one source operand location designator of the at least one dependent instruction is identical to a corresponding destination location designator of the at least one source instruction, the processor comprising:

at least one execution unit that executes instructions, each execution unit having at least one source input, each source input for receiving a source operand, each execution unit further having a result data output for outputting the result of the execution of an instruction, the at least one execution unit including a first execution unit for outputting a first result of the execution of a first source instruction, wherein a first destination location designator indicates the storage location of the first result;

a reservation station array having:
  at least one row corresponding to an instruction, each row having a plurality of fields including an opcode field for storing the opcode of the corresponding instruction, each row further having at least one source data field for storing a source operand of the corresponding instruction;

at least one associative array having at least one array line, each array line corresponding to a row, each array line for storing the at least one source operand location designator of the at least one source operand of a dependent instruction of the corresponding row, the at least one associative array having an input for receiving the first destination location designator, the associative array having circuitry for providing at least one match signal in response to a match between the received first destination location designator and a stored source operand location designator, wherein the at least one associative array comprises a first and a second associative array, each array line of the second associative array for storing the same source operand location designators stored in a corresponding array line of the first associative array;

a latch that latches the first destination location designator, and provides the latched first destination location designator to the input of the second associative array;

a ready logic circuit that determines that at least one row is ready for dispatch to an execution unit as a function of the at least one match signal, wherein the ready logic circuit determines that a first ready row and a second ready row are ready for dispatch to a second execution unit, wherein the ready logic circuit determines that the second ready row and a third ready row are ready for dispatch to the second execution unit;

a scheduler circuit, coupled to the ready logic circuit, that selects the first ready row for dispatch to the second execution unit, wherein the scheduler circuit selects the second ready row for dispatch to the second execution unit, the ready disable logic circuit thereafter disables the ready logic circuit of the second ready row, each row further comprising at least one source valid bit, each source valid bit corresponding to a source data field;

a ready disable logic circuit for disabling the ready logic circuit of a ready row after the ready row has been selected for dispatch, wherein, after the ready logic circuit of the first ready row has been disabled, the ready logic circuit determines that the second row is ready for dispatch to the second execution unit as a function of the at least one match signal provided by the second associative array;

an execution bypass multiplexer that provides the first result from the result data output of the first execution unit to the source input of an execution unit to which a ready row is to be dispatched, the first result being provided when the outputting of the first result from the first execution unit occurs after the dispatch of the ready row;

means for setting each source valid bit corresponding to a write enabled source data field after execution of the first source instruction, the ready logic circuit determining that the third ready row is ready for dispatch as a function of the source valid bit of the third ready row.

42. A computer system comprising:

a bus that communicates information:

a memory storage device, coupled to the bus, that stores instructions and data; and a processor, coupled to the bus, that processes a plurality of instructions, each instruction specifying an opcode and being associated with at least one source operand location designator indicating the storage location of a source operand, each instruction further associated with a destination location designator indicating the storage location of a result of the execution of the instruction, wherein each of at least one dependent instruction of the plurality of instructions is dependent upon at least one source instruction of the plurality of instructions such that at least one source operand location designator of the at least one dependent instruction is identical to a corresponding destination location designator of the at least one source instruction, the processor comprising:

at least one execution unit that executes instructions, each execution unit having at least one source input, each source input for receiving a source operand, each execution unit further having a result data output for outputting the result of the execution of an instruction, the at least one execution unit including a first execution unit for outputting a first result of the execution of a first source instruction, wherein a first destination location designator indicates the storage location of the first result;

a reservation station array having:
    at least one row corresponding to an instruction, each row having a plurality of fields including an opcode field for storing the opcode of the corresponding instruction, each row further having at least one source data field for storing a source operand of the corresponding instruction, each row of the reservation station array further having a destination location designator field for storing the destination location designator associated with the instruction corresponding to the row;

at least one associative array having at least one array line, each array line corresponding to a row, each array line for storing the at least one source operand location designator of the at least one source operand of a dependent instruction of the corresponding row, the at least one associative array having an input for receiving the first destination location designator, the associative array having circuitry for providing at least one match signal in response to a match between the received first destination location designator and a stored source operand location designator;

a ready logic circuit that determines that at least one row is ready for dispatch to an execution unit as a function of the at least one match signal; and an execution bypass multiplexer that provides the first result from the result data output of the first execution unit to the source input of an execution unit to which a ready row is to be dispatched, the first result being provided when the outputting of the first result from the first execution unit occurs after the dispatch of the ready row;

a destination bypass multiplexer having a first input for receiving at least one result data output of at least one execution unit, the destination bypass multiplexer further having a second input for receiving the first destination location designator from the destination location designator field of the row corresponding to the first source instruction, the destination bypass multiplexer further having an output coupled to the input of the at least one associative array, wherein the destination bypass multiplexer provides the first destination location designator from the first input if the first source instruction requires a first number of processor clock cycles for execution, the destination bypass multiplexer provides the first destination location designator from the second input if the first independent instruction requires a second number of processor clock cycles for execution, the second number being greater than the first number.

* * * * *

UNITED STATES PATENT AND TRADEMARK OFFICE
CERTIFICATE OF CORRECTION

PATENT NO. : 6,101,597
DATED : August 8, 2000
INVENTOR(S) : Colwell et al.

It is certified that error appears in the above-identified patent and that said Letters Patent is hereby corrected as shown below:

Column 26,
Line 4, delete "dy" and insert -- ready --.

Signed and Sealed this

Eighth Day of January, 2002

Attest:

JAMES E. ROGAN
Attesting Officer — Director of the United States Patent and Trademark Office